(12) United States Patent
Ragan et al.

(10) Patent No.: US 11,958,694 B2
(45) Date of Patent: Apr. 16, 2024

(54) MAGNETIC XY SORTING CONVEYOR

(71) Applicant: Laitram, L.L.C., Harahan, LA (US)

(72) Inventors: Bryant G. Ragan, Metairie, LA (US); Matthew L Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 305 days.

(21) Appl. No.: 17/693,294

(22) Filed: Mar. 11, 2022

(65) Prior Publication Data
US 2023/0286756 A1    Sep. 14, 2023

(51) Int. Cl.
*B65G 43/08*   (2006.01)
*B65G 15/30*   (2006.01)
*B65G 17/08*   (2006.01)
*B65G 23/18*   (2006.01)

(52) U.S. Cl.
CPC ............ *B65G 23/18* (2013.01); *B65G 15/30* (2013.01); *B65G 17/08* (2013.01); *B65G 43/08* (2013.01); *B65G 2201/025* (2013.01); *B65G 2203/0258* (2013.01); *B65G 2203/042* (2013.01); *B65G 2207/34* (2013.01)

(58) Field of Classification Search
CPC ....... B60L 13/003; B65G 23/18; B65G 15/30; B65G 17/08; B65G 47/52; B65G 2201/025; B65G 2203/0258; B65G 2203/042; B65G 2207/34
See application file for complete search history.

(56) References Cited

U.S. PATENT DOCUMENTS

| 4,138,011 A | 2/1979 | Lapeyre |
| 4,170,281 A | 10/1979 | Lapeyre |

(Continued)

FOREIGN PATENT DOCUMENTS

| WO | 2013059934 A1 | 5/2013 |
| WO | 2014152512 A1 | 9/2014 |

(Continued)

OTHER PUBLICATIONS

International Search Report and Written Opinion of the ISA/KR of International Patent Application No. PCT/US2023/011228, Korean Intellectual Property Office, May 10, 2023.

*Primary Examiner* — Gene O Crawford
*Assistant Examiner* — Lester Rushin, III
(74) *Attorney, Agent, or Firm* — Carver, Darden, Koretzky, Tessier, Finn, Blossman & Areaux LLC; Raymond G. Areaux; J. Matthew Miller, III

(57) ABSTRACT

Exemplary embodiments provide a sorting system using the principles of linear motors to move a magnetized mat in multiple directions. The sorting system uses a series of stator coils in particular patterns to direct the magnetized mat along predefined looping pathways such that the magnetized mat can move articles in a desired direction. Embodiments include the use of multiple magnetized mats to improve package sorting rates. The magnetized mat is comprised of a plurality of magnetized and non-magnetized tiles which are connected using flexible tabs that form a living hinge. The living hinge flexes and allows the mat to travel along the predefined looping pathways. The sorting system may be used as a node in a larger grid sorting system and may be connected to conveyors, chutes, or other means for moving articles.

24 Claims, 19 Drawing Sheets

(56) References Cited

U.S. PATENT DOCUMENTS

| | | | | |
|---|---|---|---|---|
| 6,003,230 | A * | 12/1999 | Trumper | H02K 41/031 |
| | | | | 33/DIG. 1 |
| 6,208,045 | B1 * | 3/2001 | Hazelton | H02K 41/03 |
| | | | | 414/935 |
| 6,441,514 | B1 * | 8/2002 | Markle | H02K 41/031 |
| | | | | 310/12.24 |
| 6,847,134 | B2 * | 1/2005 | Frissen | H02K 41/031 |
| | | | | 310/12.05 |
| 6,987,335 | B2 * | 1/2006 | Korenaga | H02N 15/02 |
| | | | | 310/12.15 |
| 7,436,135 | B2 * | 10/2008 | Miyakawa | H02K 41/03 |
| | | | | 318/560 |
| 7,789,221 | B2 | 9/2010 | Lapeyre et al. | |
| 7,948,122 | B2 * | 5/2011 | Compter | G03F 7/70758 |
| | | | | 414/935 |
| 8,967,051 | B2 * | 3/2015 | King | B60L 13/10 |
| | | | | 104/284 |
| 9,065,310 | B2 | 6/2015 | Ragan et al. | |
| 2015/0129393 | A1 | 5/2015 | Ragan | |
| 2017/0334663 | A1 | 11/2017 | Ragan et al. | |
| 2019/0233220 | A1 * | 8/2019 | Ragan | B65G 45/10 |

FOREIGN PATENT DOCUMENTS

| | | | |
|---|---|---|---|
| WO | 2020086292 | A1 | 4/2020 |
| WO | 2020086352 | A1 | 4/2020 |
| WO | 2020163129 | A1 | 8/2020 |

* cited by examiner x - Loop 480    y - Loop 490

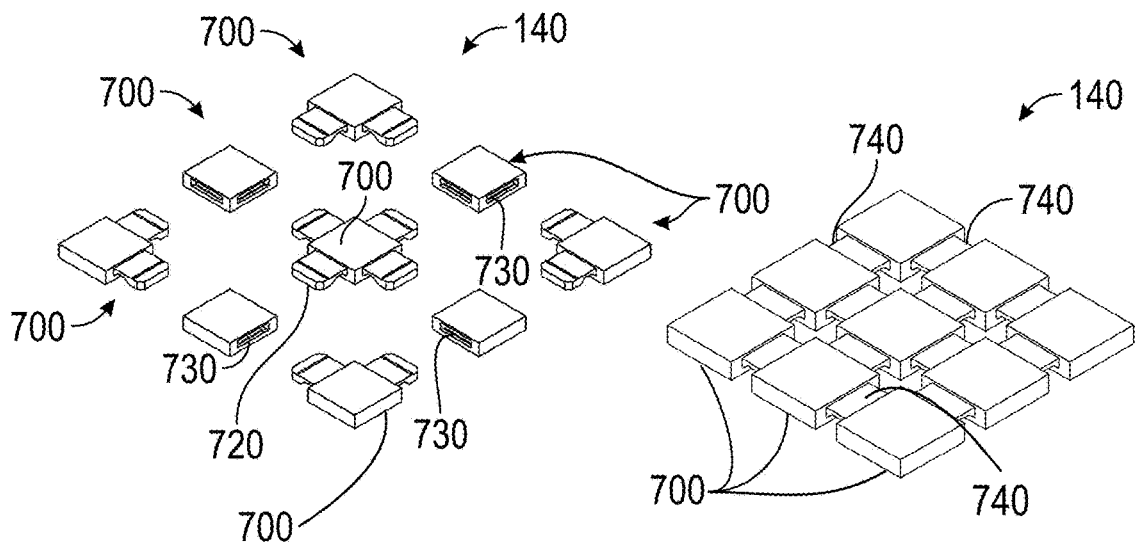
FIG. 6C    FIG. 6D
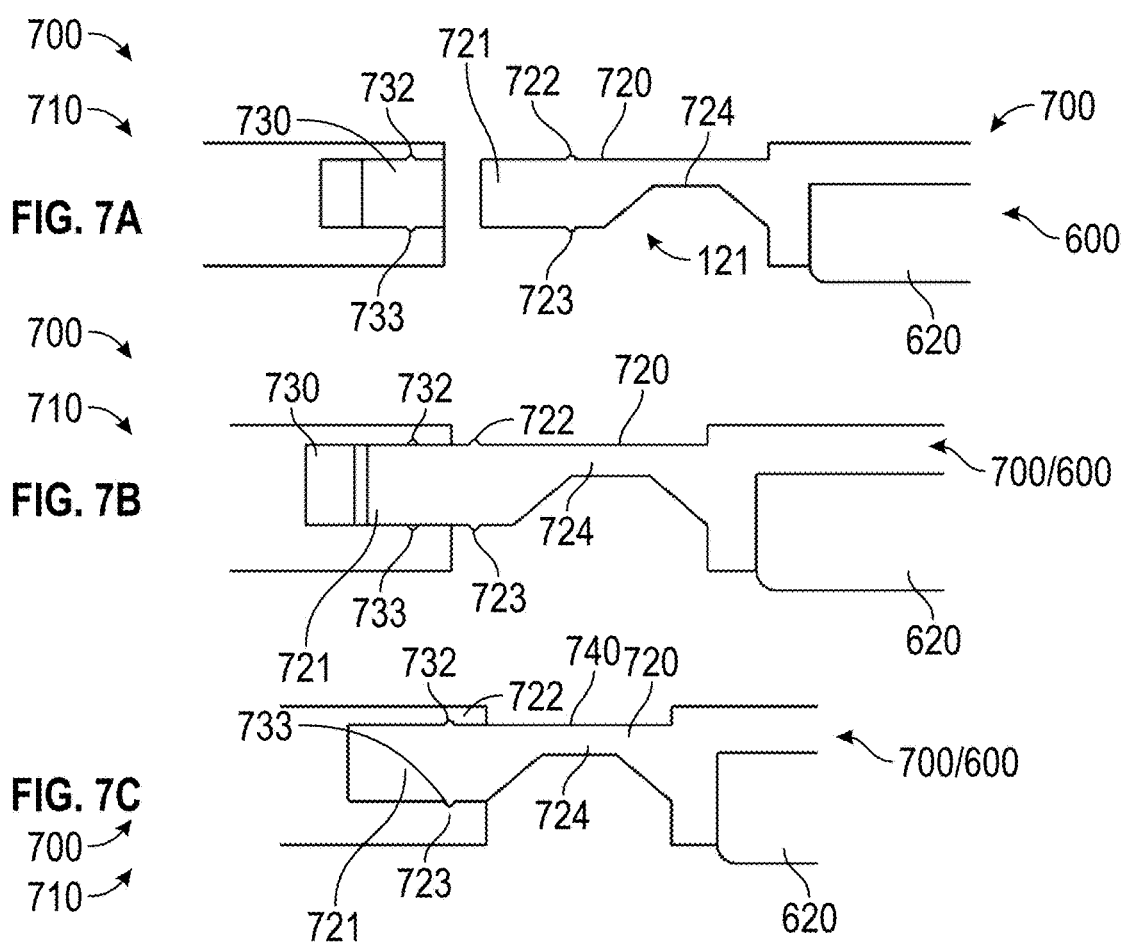
FIG. 7A
FIG. 7B
FIG. 7C

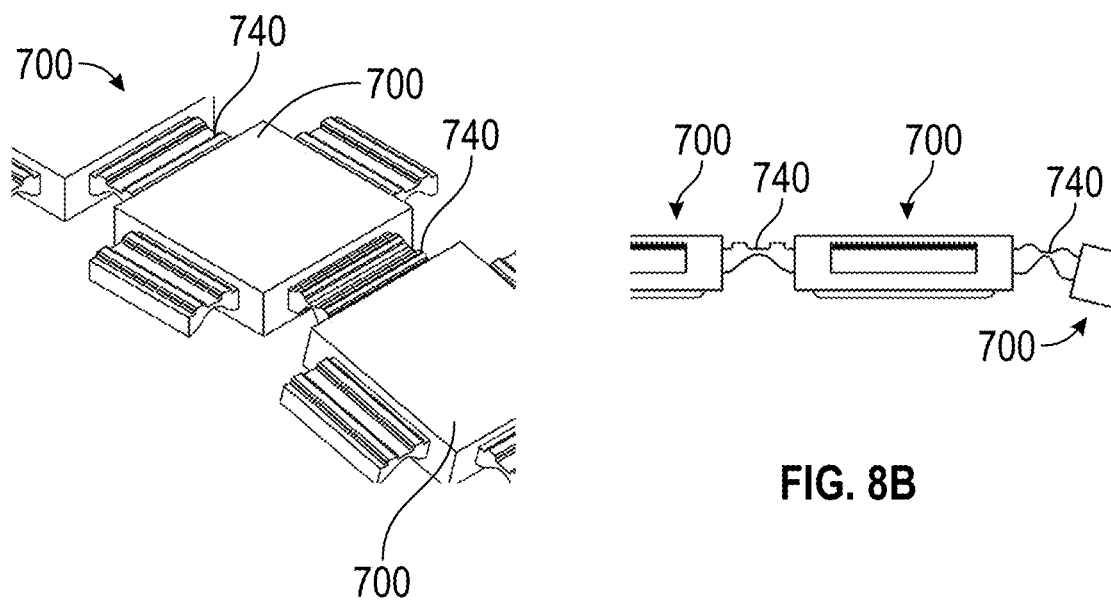
FIG. 8A
FIG. 8B
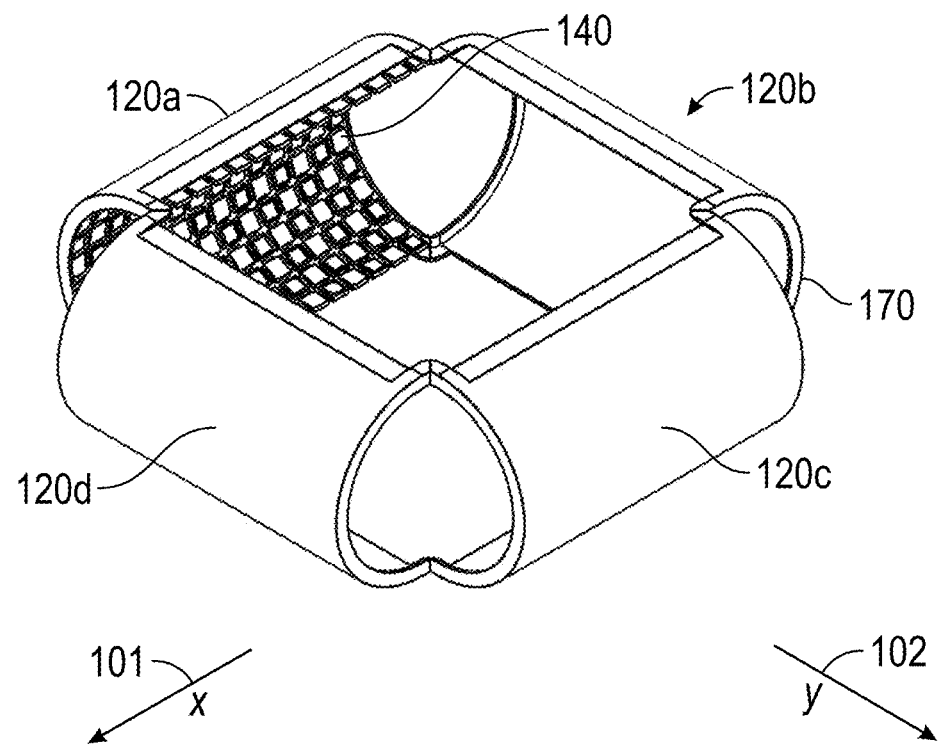
FIG. 9A

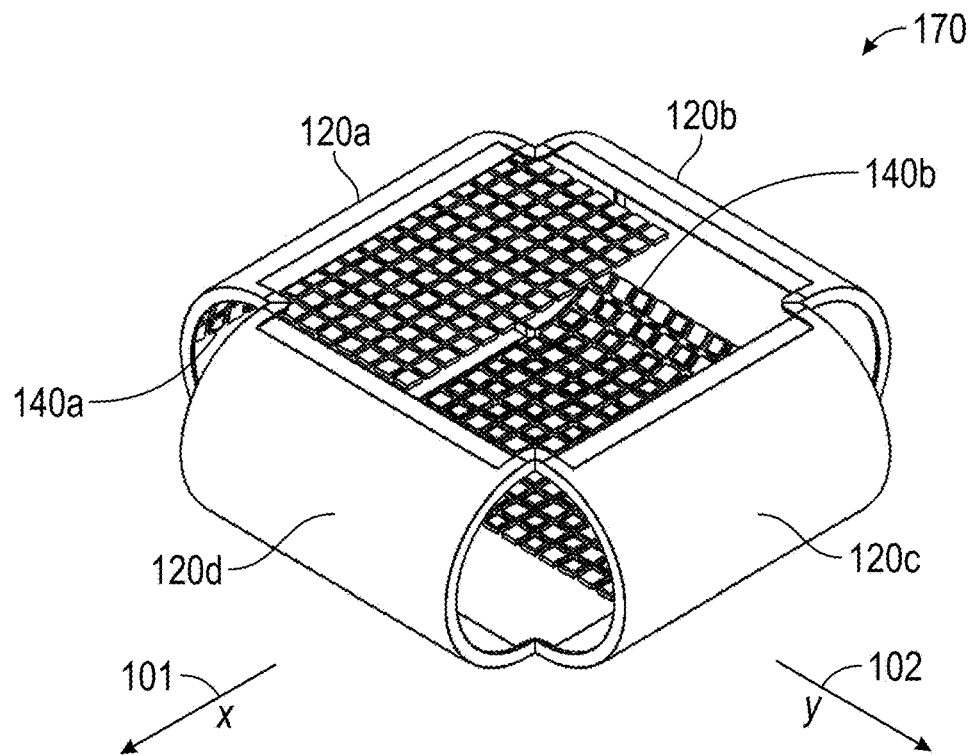
FIG. 10C
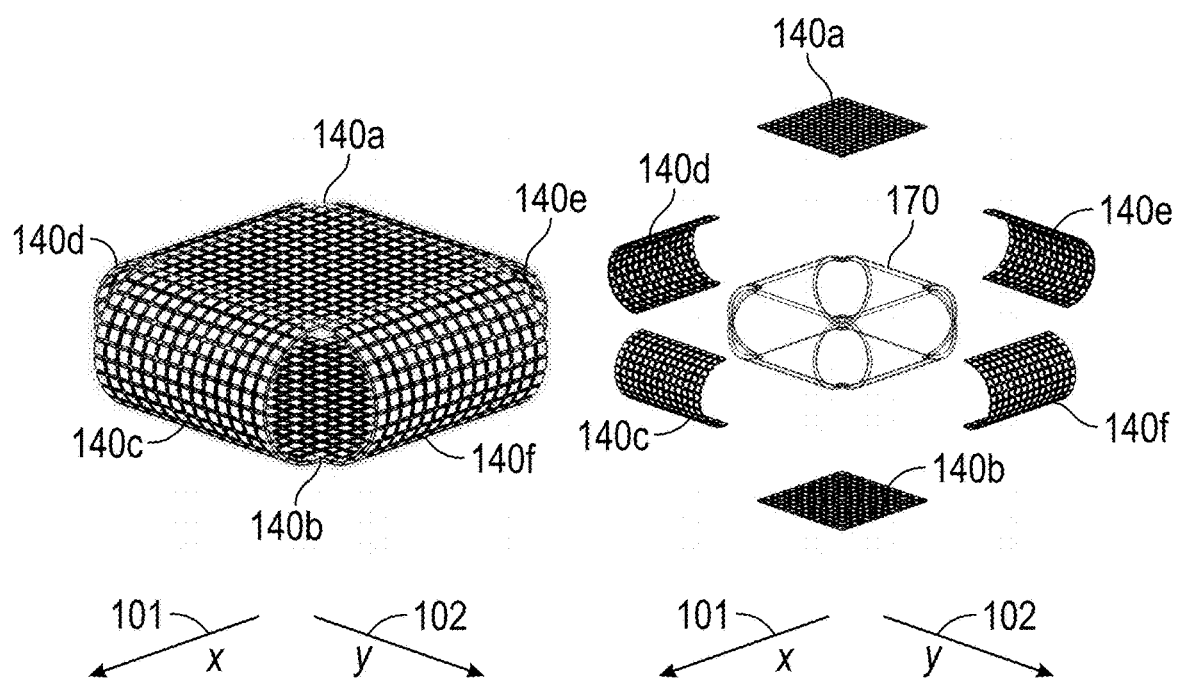
FIG. 10D　　　　FIG. 10E

FIG. 10F  FIG. 10G

MAGNETIC XY SORTING CONVEYOR

BACKGROUND OF THE INVENTION

The invention relates generally to permanent magnet brushless direct current (BLDG) conveyors and more particularly to a permanent magnet brushless direct current conveyor capable of moving in multiple directions for the purpose of conveying a package, product, or other conveyed item (each an "article") to a desired location. Permanent magnet brushless direct current conveyors incorporate a mover containing magnets and a stator with coils capable of producing one or more currents for generating magnetic fields. Permanent magnet brushless direct current conveyors make use of the Lorentz force produced by the direct current in the coil wire interacting with the magnetic field of the permanent magnets to displace the conveyor-moving surface in the desired conveyed direction. The direct currents are alternately commutated (switched) so that the produced force is always in the same direction. In other words, permanent magnet brushless direct current conveyors use the magnetic fields to apply force to one or more movers. This force is capable of propelling the mover in desired directions.

A drawback of currently available conveyor systems is the difficulty in sorting articles. Prior systems deliver a large number of articles to a high-speed sorting machine, which sorts articles for transport within the conveyor system. A more desirable method is a grid sorter capable of routing articles from a starting location to an ending destination within a conveyor system. However, a grid sorter requires a reliable conveyor that can direct articles in a plurality of directions.

SUMMARY OF THE INVENTION

The disclosed magnetic XY sorting conveyor is capable of directing articles in a plurality of directions, specifically, forward, backward, left, and right. Thus, the disclosed magnetic XY sorting conveyor enables the creation of a grid sorter that can transport a package from one of a plurality of input locations to one of a plurality of output locations.

One version of a sorter embodying features of the invention comprises a first XY-stator, a first tile assembly, and a controller, wherein said first XY-stator comprises a first set of X-stator coils, a first set of Y-stator coils, and a first plurality of Hall sensors; wherein said first set of X-stator coils is flush with said first set of Y-stator coils; wherein said first XY-stator is operatively connected to said controller; wherein said first tile assembly comprises a first plurality of tiles; wherein said first plurality of tiles includes a first plurality of magnetic tiles and a first plurality of non-magnetic tiles; and wherein said controller is configured to receive signals from said first plurality of Hall sensors and is configured to selectively apply currents to said first set of X-stator coils and to said first set of Y-stator coils in order to direct motion of said first tile assembly.

In another aspect of the invention, the first plurality of tiles are connected by a plurality of means for flexibly connecting.

In another aspect of the invention each of said first plurality of tiles is connected to at least one other tile of said first plurality of tiles by one or more flexible connectors, wherein said one or more flexible connectors comprise, at least one tab on a first one of said first plurality of tiles and at least one receptacle on a second one of said first plurality of tiles, and wherein said at least one receptacle is configured to receive said at least one tab In another aspect of the invention, the at least one receptacle comprises at least one groove and said at least one tab comprises at least one lip, and said receptacle and said tab are configured to allow said at least one lip to slide into said at least one groove when said tab is fully inserted into said receptacle.

In another aspect of the invention, the tab comprises an end and a middle section and said middle section is more flexible than a body of each of said first plurality of tiles.

In another aspect of the invention, the tab comprises an end and a middle section and said middle section is approximately 0.015 inches thick.

In another aspect of the invention, each of said first plurality of magnetic tiles is only connected to one or more of said first plurality of non-magnetic tiles.

In another aspect of the invention, each of said first plurality of magnetic tiles contain one or more polymagnets arranged in a Halbach array.

In another aspect of the invention, the sorter further comprises a second XY-stator and a plurality of curved sets of stator coils, wherein an edge of said first XY-stator is adjacent to a top edge of each of said plurality of curved sets of stator coils and an edge of said second XY-stator is adjacent to a bottom edge of each of said plurality of curved sets of stator coils; wherein said second XY-stator comprises a second set of X-stator coils, a second set of Y-stator coils, and a second plurality of Hall sensors; wherein said second set of X-stator coils is flush with said second set of Y-stator coils; wherein said second XY-stator is operatively connected to said controller; wherein each of said plurality of curved sets of stator coils comprises an additional set of Hall sensors and is operatively connected to said controller; and wherein said controller is configured to receive signals from said second plurality of Hall sensors and each said additional set of Hall sensors and is configured to selectively apply currents to said second set of X-stator coils, to said second set of Y-stator coils, and to each additional set of stator coils in order to direct motion of said first tile assembly.

In another aspect of the invention, said sorter is configured to apply currents in a sequence to said first XY-stator, to said second XY-stator, and to said plurality of curved sets of stator coils to move said first tile assembly from a location above said first XY-stator, along any of said plurality of curved sets of stator coils, to a location below said second XY-stator, and from a location below said second XY-stator, along any of said plurality of curved sets of stator coils, to said location above said first XY-stator.

In another aspect of the invention, the sorter further comprises a frame and a plurality of return chutes connected to said frame, wherein said first tile assembly passes through an interior portion of one of said plurality of return chutes, and wherein each of said plurality of return chutes limits a distance of said first tile assembly from each corresponding one of said plurality of curved sets of stator coils while said first tile assembly passes through said interior portion.

In another aspect of the invention, said first and second XY-stators and a first two of said plurality of curved sets of stator coils form a first loop and said first and second XY-stators and a second two of said plurality of curved sets of stator coils form a second loop, wherein said sorter is configured to allow motion of said first tile assembly along said first loop from a first point on said first loop to any other point on said first loop and to allow motion of said first tile assembly from along said second loop from a first point on said second loop to any other point on said second loop.

In another aspect of the invention, said sorter further comprises a second tile assembly, wherein said second tile assembly comprises a second plurality of tiles; wherein said second plurality of tiles includes a second plurality of magnetic tiles and a second plurality of non-magnetic tiles; and wherein said controller is configured to simultaneously control a respective position of both said second tile assembly and said first tile assembly.

In another aspect of the invention, said first and second XY-stators and a first two of said plurality of curved sets of stator coils form a first loop and said first and second XY-stators and a second two of said plurality of curved sets of stator coils form a second loop, wherein said sorter is configured to allow motion of said first tile assembly and said second tile assembly along said first loop from a first point on said first loop to any other point on said first loop and to allow motion of said first tile assembly and said second tile assembly along said second loop from a first point on said second loop to any other point on said second loop.

In another aspect of the invention, said controller is configured to direct movement of said first tile assembly along said first loop simultaneously with movement of said second tile assembly along said second loop.

In another aspect of the invention, said first plurality of tiles are connected by a first plurality of means for flexibly connecting and said second plurality of tiles are connected by a second plurality of said means for flexibly connecting.

One version of a sorter embodying features of the invention comprises a first XY-stator, a second XY-stator, a plurality of curved sets of stator coils, a plurality of tile assemblies, and a controller; wherein said first XY-stator comprises a first set of X-stator coils, a first set of Y-stator coils, and a first plurality of Hall sensors; and said first set of X-stator coils is flush with said first set of Y-stator coils; wherein said second XY-stator comprises a second set of X-stator coils, a second set of Y-stator coils, and a second plurality of Hall sensors; and said second set of X-stator coils is flush with said second set of Y-stator coils; wherein said first XY-stator is operatively connected to said controller; wherein said second XY-stator is operatively connected to said controller; wherein each of said plurality of curved sets of stator coils comprises an additional set of Hall sensors and is operatively connected to said controller; wherein each of said plurality of tile assemblies respectively comprises a plurality of tiles; wherein each said plurality of tiles includes a plurality of magnetic tiles and a plurality of non-magnetic tiles; wherein an edge of said first XY-stator is adjacent to a top edge of each of said plurality of curved sets of stator coils and an edge of said second XY-stator is adjacent to a bottom edge of each of said plurality of curved sets of stator coils; wherein said controller is configured to receive signals from said first plurality of Hall sensors, said second plurality of Hall sensors, and each said additional set of Hall sensors, and is configured to selectively apply currents to said first set of X-stator coils, to said first set of Y-stator coils, to said second set of X-stator coils, to said second set of Y-stator coils, and to each additional set of stator coils, in order to direct motion of said plurality of tile assemblies.

In another aspect of the invention, said first and second XY-stators and a first two of said plurality of curved sets of stator coils form a first loop and said first and second XY-stators and a second two of said plurality of curved sets of stator coils form a second loop, wherein said sorter is configured such that a first subset of said plurality of tile assemblies is capable of covering a surface of said first loop while a second subset of said plurality of tile assemblies is capable of covering a surface of said second loop; wherein said sorter is configured such that said sorter is capable of directing simultaneous motion of each tile assembly in said first subset along said first loop and is capable of directing simultaneous motion of said second subset along said second loop.

In another aspect of the invention, said plurality of tile assemblies is six tile assemblies, said first subset includes a first four of said six tile assemblies, and said second subset includes a second four of said six tile assemblies, wherein said second four includes two of said first four.

In another aspect of the invention, said first plurality of tiles are connected by a first plurality of means for flexibly connecting and said second plurality of tiles are connected by a second plurality of said means for flexibly connecting.

One version of a grid sorter embodying features of the invention comprises a plurality of sorting nodes, wherein each grid sorting node comprises a first XY-stator, a first tile assembly, and a controller, wherein said first XY-stator comprises a first set of X-stator coils, a first set of Y-stator coils, and a first plurality of Hall sensors; wherein said first set of X-stator coils is flush with said first set of Y-stator coils; wherein said first XY-stator is operatively connected to said controller; wherein said first tile assembly comprises a first plurality of tiles; wherein said first plurality of tiles includes a first plurality of magnetic tiles and a first plurality of non-magnetic tiles; and wherein said controller is configured to receive signals from said first plurality of Hall sensors and is configured to selectively apply currents to said first set of X-stator coils and to said first set of Y-stator coils in order to direct motion of said first tile assembly, wherein each grid sorting node is operatively connected to one or more conveyors and at least one of said one or more conveyors is operatively connected to two of said plurality of sorting nodes, thereby forming one or more paths for carrying packages.

In another aspect of the invention, each of said plurality of grid sorting nodes is operatively connected to four conveyors.

In another aspect of the invention, said grid sorter is capable of transporting one or more packages having a weight of at least 20 pounds per square foot across any of said one or more paths.

In another aspect of the invention, said grid sorter comprises one or more sensors along the one or more conveyors configured to detect the presence of articles on the one or more conveyors and to send signals to said controller to synchronize said plurality of grid sorting nodes to the one or more conveyors

BRIEF DESCRIPTION OF THE DRAWINGS

FIG. 6C is an exploded isometric view of a tile assembly showing connections between individual tiles.

FIG. 6D is an isometric view of a tile assembly.

FIGS. 7A, 7B, and 7C each depict a side view of a living hinge in a tile assembly in successive stages of connection, FIG. 8A is an isometric view of a portion of a tile assembly showing the bending of a living hinge in a tile assembly.

FIG. 8B shows a side view of a tile assembly showing the bending of a living hinge in a tile assembly.

FIG. 9A is an isometric view of a tile assembly in a stator assembly of an XY sorter, with the tile assembly shown held in a return chute.

FIG. 10C is an isometric view of a plurality of tile assemblies in a single stator assembly of an XY sorter, with a first tile assembly moving from a return chute to the top of the XY sorter, and a second tile assembly moving from a return chute to a bottom of the stator assembly, FIG. 10D is an isometric view of a plurality of tile assemblies configured to surround a stator assembly.

FIG. 10E is an isometric exploded view of a plurality of tile assemblies configured to surround a stator assembly.

FIG. 10F is an isometric view of a stator assembly with a plurality of tile assemblies, demonstrating the tile assemblies that move in unison when directing motion generally in the direction of the y-axis.

FIG. 10G is an isometric view of a stator assembly with a plurality of tile assemblies, demonstrating the tile assemblies that move in unison when direction motion generally in the direction of the x-axis.

Figure 1:
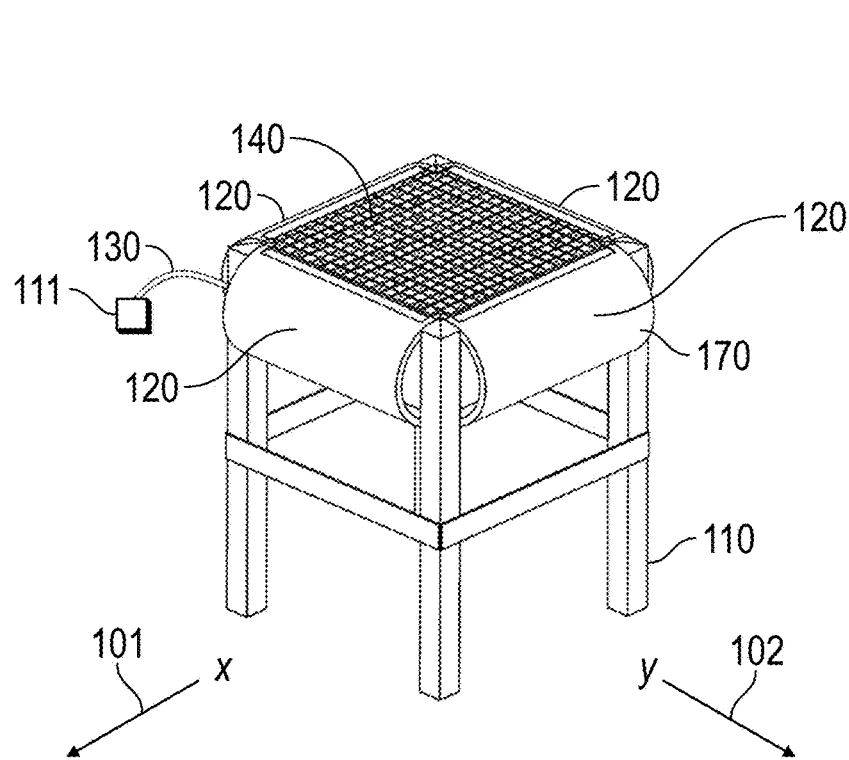
FIG. 1 is an isometric view of an XY sorter.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION OF THE INVENTION

A grid sorter comprises a plurality of conveyors having one or more intersections. At each intersection is a device configured to send conveyed articles to a desired conveyor. Disclosed herein are improvements to grid sorters that improve the ability of a grid sorter to transition conveyed articles across grid sorter intersections. The invention will be described relative to certain illustrative embodiments, though those skilled in the art will recognize that the invention is not limited to the illustrative embodiments.

Turning now to the figures, FIG. 1 depicts one version of an XY sorter 100. XY sorter 100 comprises controller 111, frame 110, tile assembly 140, and stator assembly 170. Stator assembly 170 comprises a plurality of return chutes 120, power and control cable 130, and one or more XY-stators 150 (shown in FIG. 2 and FIG. 3a). In some embodiments, stator assembly 170 comprises one or more curved sets of stator coils 400 (shown in FIGS. 4a-4c). Frame 110 is a structure capable of supporting other components of XY sorter 100. Controller 111 controls magnetic fields produced by stators (not shown in FIG. 1) held within frame 110, and more specifically held within the perimeter of the plurality of return chutes 120. Controller 111 is a standard BLDC controller.

As used herein and in the claims, the term, "stator coil" means an individually-activatable electromagnet and has the same meaning as a "stator winding" or a "field coil."

Tile assembly 140 contains a plurality of magnets arranged to interact with stator currents applied to stators (not shown in FIG. 1) to create a BLDC linear motor capable of acting along a plurality of axes of orientation. Thus, the magnetic fields impart a force on magnets contained within tile assembly 140, causing motion of tile assembly 140. Articles placed on tile assembly 140 can thus be conveyed in the direction of motion of tile assembly 140. Power and control cable 130 is a cable that contains a plurality of wires capable of delivering power to individual stators (not shown in FIG. 1) and capable of providing communications between one or more sensors contained within said XY sorter 100 (e.g., Hall sensors 317 and 327, not shown in FIG. 1) and said controller 111.

X-axis 101 is an axis of orientation of XY sorter 100 and is also a direction in which articles are sorted. Y-axis 102 is also an axis of orientation of XY sorter 100 and is also a direction in which articles are sorted. Articles may arrive into XY sorter 100 from either side along x-axis 101 and from either side along y-axis 102 and may be sorted to exit XY sorter 100 from either side along x-axis 101 or either side along y-axis 102.

In one embodiment, XY sorter 100 is about 4 feet tall and is about 3 feet wide and is about 3 feet in width.

Figure 2:
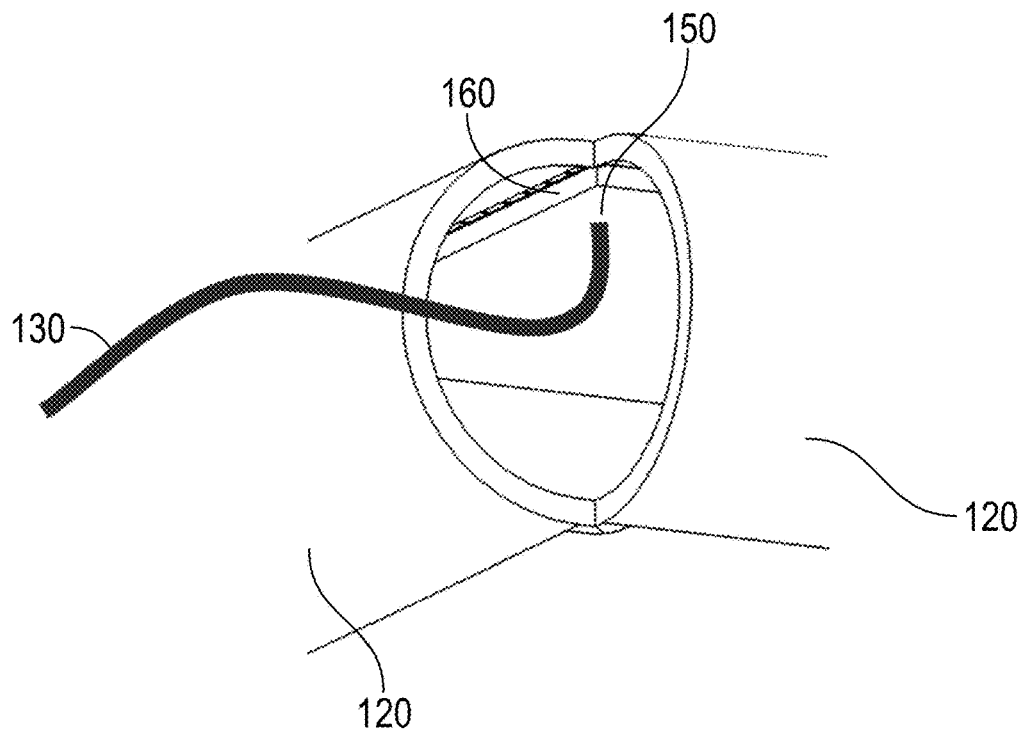
FIG. 2 is a close-up view of an XY sorter showing a stator.

FIG. 2 shows a close-up view of XY sorter 100 showing a location of an XY-stator 150 within frame 110 and the plurality of return chutes 120. FIG. 2 also shows a connection of power and control cable 130 to top XY-stator 150. FIG. 2 also shows XY-stator coils 160 as part of XY-stator 150. In some embodiments, XY sorter 100 may have multiple XY-stators 150, with some embodiments having an XY-stator placed at a bottom end of a stator assembly 170.

Figure 3A:
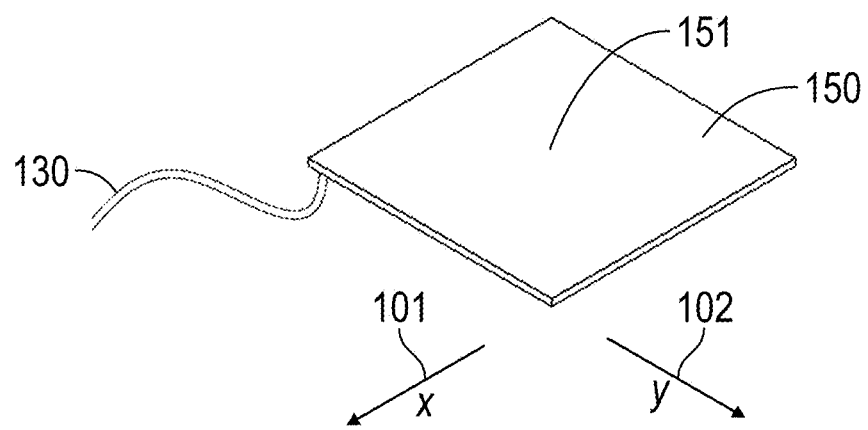
FIG. 3A is an isometric view of a potted XY-stator.

FIG. 3A shows an isometric view of an XY-stator 150 with power and control cable 130. XY-stator 150 comprises a set of X-stator coils 310 and a set of Y-stator coils 320 (shown in FIG. 3B). In FIG. 3A, a set of XY-stator coils 330, itself comprising a set of X-stator coils 310 and a set of Y-stator coils 320 (see FIGS. 3C-3D), is enclosed within XY-stator 150 as part of a potted assembly, with the top surface 151 of XY-stator being coated with a low-friction material such as, but not limited to, ultra-high molecular weight polyethylene. Also shown are x-axis 101 and y-axis 102 showing the orientation of the XY-stator 150.

An XY-stator 150 (shown in FIGS. 2 and 3A) comprises a set of XY-stator coils 330 (depicted in FIGS. 3C and 3D) encapsulated within a potting material for mechanical stability with a low-friction material such as UHMW polyethylene on the magnet facing side.

Figure 3B:
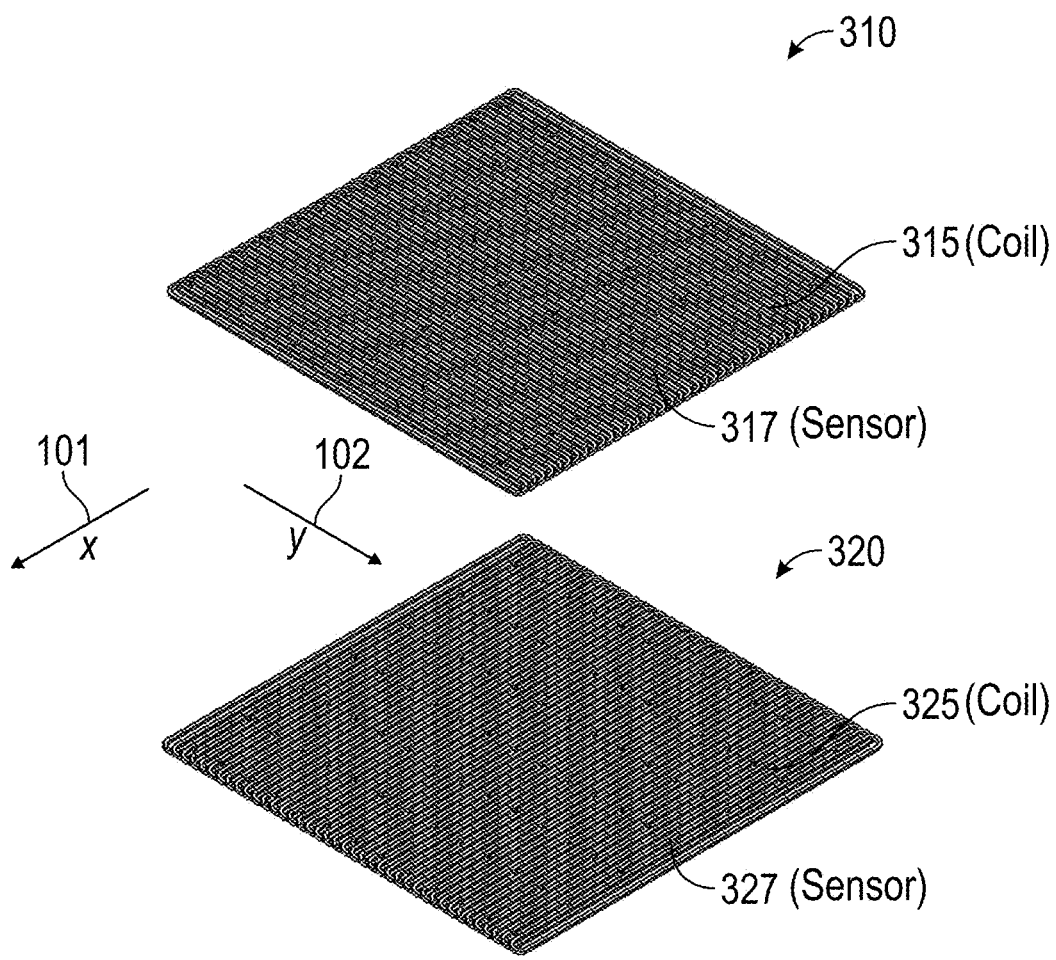
FIG. 3B is an isometric view of an X-stator coil and a Y-stator coil.

FIG. 3B shows isometric views of a set of X-stator coils 310 and a set of Y-stator coils 320, which are both enclosed within XY-stator 150. A set of X-stator coils 310 comprises a plurality of stator coils 315 and a plurality of Hall sensors 317. A set of Y-stator coils 320 comprises a plurality of stator coils 325 and a plurality of Hall sensors 327. Also shown are x-axis 101 and y-axis 102 showing the orientation of the set of X-stator coils 310 and the set of Y-stator coils 320.

FIG. 3B depicts the relative alignment of a set of X-stator coils 310 and a set of Y-stator coils 320 in an embodiment of a set of XY-stator coils 330.

Figure 3C:
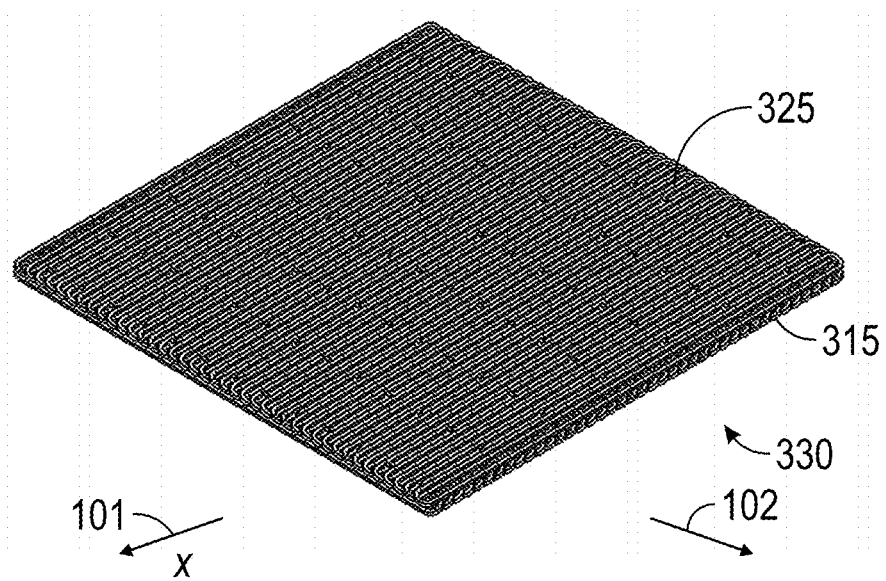
FIG. 3C is an isometric view of an XY-stator coil set.
Figure 3D:
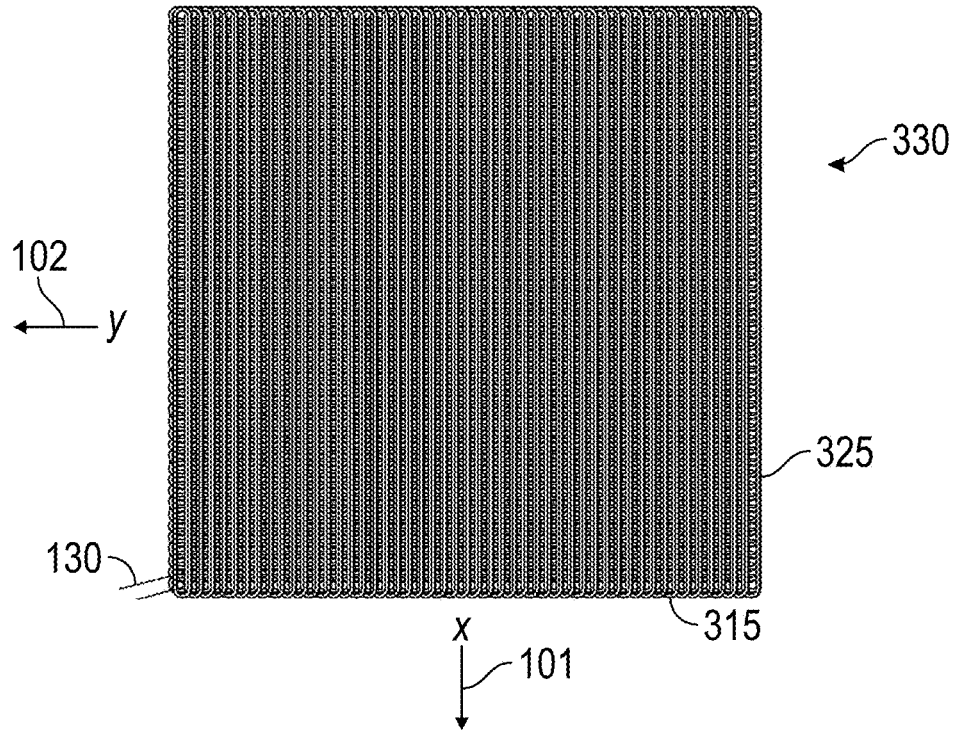
FIG. 3D is a top view of an XY-stator.

FIGS. 3C and 3D show an isometric view and a top view, respectively, of a set of XY-stator coils 330. A set of XY-stator coils 330 comprises a set of X-stator coils 310 and a set of Y-stator coils 320, with the set of X-stator coils 310 positioned flush with the set of Y-stator coils 320. The depicted embodiment shows a set of X-stator coils 310 being vertically adjacent to a set of Y-stator coils 320 and also shows a set of X-stator coils 310 having approximately the same length and width as a set of Y-stator coils 320.

Figure 4A:
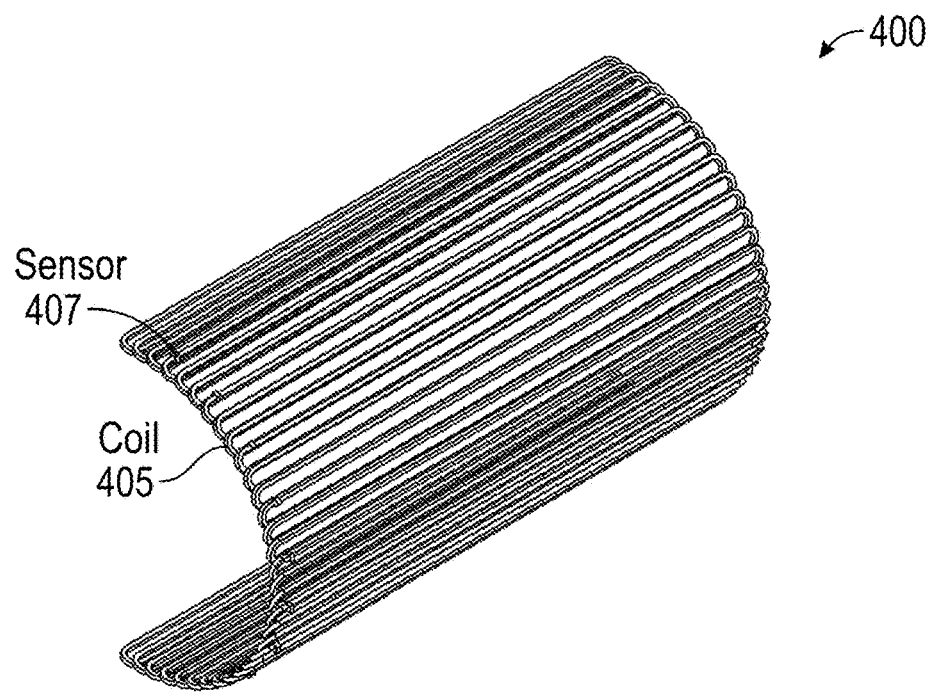
FIG. 4A is an isometric view of a curved stator coil.

FIG. 4A shows an isometric view of a curved set of stator coils 400 which comprises a plurality of stator coils 405 and a plurality of Hall sensors 407 arranged in a half-cylindrical shape.

Each stator coil 315, each stator coil 325, and each stator coil 405 is configured to selectively generate a magnetic field. In some embodiments, the stator coils 315 of a set of X-stator coils 310, the stator coils 325 of a set of Y-stator coils 320, and the stator coils 405 of each curved stator coil set 400 form a multi-phase coil that allows current to flow transverse to the desired direction of motion of the tile assembly 140 and interacting with the magnets 620 contained within tile assembly 140 to cause displacement of said magnets 620 and tile assembly 140. In one embodiment, each stator coil 315, each stator coil 325, and each stator coil 405 is non-ferrous to limit undesired attraction of the magnets 620 to each stator coil 315, each stator coil 325, and each stator coil 405. In one embodiment, the multi-phase coils respectively formed by the stator coils 315, the stator coils 325, and the stator coils 405 are three phase coils.

In use, an electric current may be sequentially applied to each stator coil 325, each stator coil 315, or each stator coil 405 in order to apply forces to one or more magnets. These forces can be harnessed to move and sort articles. For example, in one embodiment, an article may be moved along x-axis 101 by applying currents to individual stator coils 315 in a set of X-stator coils 310 (to move tile assembly 140 along x-axis 101) and an article may be moved along y-axis 102 by applying currents to individual stator coils 325 in a set of Y-stator coils 320 (to move tile assembly 140 along y-axis 102).

In some embodiments, the stator coils 315 are commutated based on signals from the Hall sensors 317, the stator coils 325 are commutated based on signals from the hall sensors 327, and the stator coils 405 are commutated based on signals from the Hall sensors 407. In these embodiments, the respective coils are commutated so that the currents are synchronized to the motion of the magnets 620 of a tile assembly 140, thereby coordinating motion of tile assembly 140.

In some embodiments, each stator coil 315 in a set of X-stator coils 310 is approximately parallel with a top surface of XY-stator 150 and its major axis is approximately perpendicular to x-axis 101, and each stator coil 325 in a set of Y-stator coils 320 is approximately parallel with a top surface of XY-stator 150 and its major axis is approximately perpendicular to y-axis 102. Thus, in embodiments where x-axis 101 and y-axis 102 are approximately perpendicular, motion may be directed along these two approximately perpendicular axes.

One of skill in the art understands that, because each stator coil 315 in a set of X-stator coils 310 is approximately coparallel, and because each stator coil 325 in a set of Y-stator coils 320 is approximately coparallel, the relative rotation of the x-axis 101 and the y-axis 102 discussed in the immediately preceding paragraph is the equivalent of the rotational angle in an XY-stator 150 between a set of X-stator coils 310 and a set of Y-stator coils 320. In other words, as used herein and in the claims, the angle between a set of X-stator coils 310 and a set of Y-stator coils 320 in an XY-stator 150 is the angle between a first line coplanar with a top surface of XY-stator 150 that is perpendicular to the major axes of stator coils 315 in the set of X-stator coils 310 and a second line coplanar with a top surface of XY-stator 150 that is perpendicular to the major axes of stator coils 325 in a set of Y-stator coils 320, and such angle will be about 90 degrees. Additionally, the terms "x-", "y-", "X-", "Y-", and "XY-" are used for ease of explanation and clarity. The use of these terms is intended to be non-limiting. For example, the terms "X-" and "Y-" are used to differentiate between sets of stator coils and do not imply, either here or in the claims, any particular structure or orientation.

In some embodiments where a curved set of stator coils 400 forms a half-cylindrical shape, each stator coil 405 is approximately parallel to each other stator coil 405 and the major axis of each stator coil 405 is perpendicular to either x-axis 101 or y-axis 102. Thus, a curved set of stator coils 400 forms a curved surface that is roughly a half-cylinder.

In some embodiments, each individual stator coil 315 of a set of X-stator coils 310, each individual stator coil 325 of a set of Y-stator coils 320, and each individual stator coil 405 of each curved set of stator coils 400 extends from a first end of a set of X-stator coils 310, a first end of a set of Y-stator coils 320, and a first end of a curved set of stator coils 400, respectively, to an opposite end of a set of X-stator coils 310, an opposite end of a set of Y-stator coils 320, and an opposite end of a curved set of stator coils 400, respectively. In other words, each individual stator coil 315 extends the width of the set of X-stator coils 310, each individual stator coil 325 extends the width of the set of Y-stator coils 320, and each individual stator coil 405 extends the width of each curved set of stator coils 400.

In other embodiments, each individual stator coil 315, each individual stator coil 325, and each individual stator coil 405 includes a curved end and thus effectively, "doubles back." In other words, a first member of each stator coil 315, a first member of each stator coil 325, and a first member of each stator coil 405 extends from a first end of a set of X-stator coils 310, a first end of a set of Y-stator coils 320, and a first end of a curved set of stator coils 400 to an opposite end of a set of X-stator coils 310, an opposite end of a set of Y-stator coils 320, and an opposite end of a curved set of stator coils 400; and, a second member of each stator coil 315, a second member of each stator coil 325, and a second member of each stator coil 405 extends from the opposite end of a set of X-stator coils 310, the opposite end of a set of Y-stator coils 320, and the opposite end of a curved set of stator coils 400 to the first end of a set of X-stator coils 310, the first end of a set of Y-stator coils 320, and the first end of a curved set of stator coils 400, respectively. In such embodiments, each first member of each stator coil 315 is connected to each second member of each stator coil 315 by one or more approximately semi-circular bends, each first member of each stator coil 325 is connected to each second member of each stator coil 325 by one or more approximately semi-circular bends, and each first member of each stator coil 405 is connected to each second member of each stator coil 405 by one or more approximately semi-circular bends. In some such embodiments where XY-stator 150 is approximately 3 feet by 3 feet square, a set of X-stator coils 310 comprises about 40 stator coils 315; a set of Y-stator coils 320 comprises about 40 stator coils 325, and a curved set of stator coils 400 comprises about 33 stator coils 405.

We speculate that embodiments that contain the above-mentioned semi-circular bends allow for easier wiring and provide sufficient current while reducing the number of individual stator coils 315 that need to be controlled independently.

Each Hall sensor 317, each Hall sensor 327, and each Hall sensor 407 is a sensing device capable of detecting a magnetic field, e.g., by using the Hall effect. The Hall sensors 317, Hall sensors 327, and Hall sensors 407 are mounted for detecting the magnetic field of tile assembly 140 and for commutating top XY-stator coil 460, bottom XY-stator coil 470, and the four curved sets of stator coils 400a, 400b, 400c, 400d (shown in FIG. 4B). Each Hall sensor 317, each Hall sensor 327, and each Hall sensor 407 is electrically connected to controller 111 via power and control cable 130.

In an embodiment where XY-stator 150 is approximately 3 feet by 3 feet square, XY-stator comprises about 91 Hall sensors 317 and about 91 Hall sensors 327, and each curved set of stator coils 400 comprises about 11 Hall sensors 407.

Figure 4B:
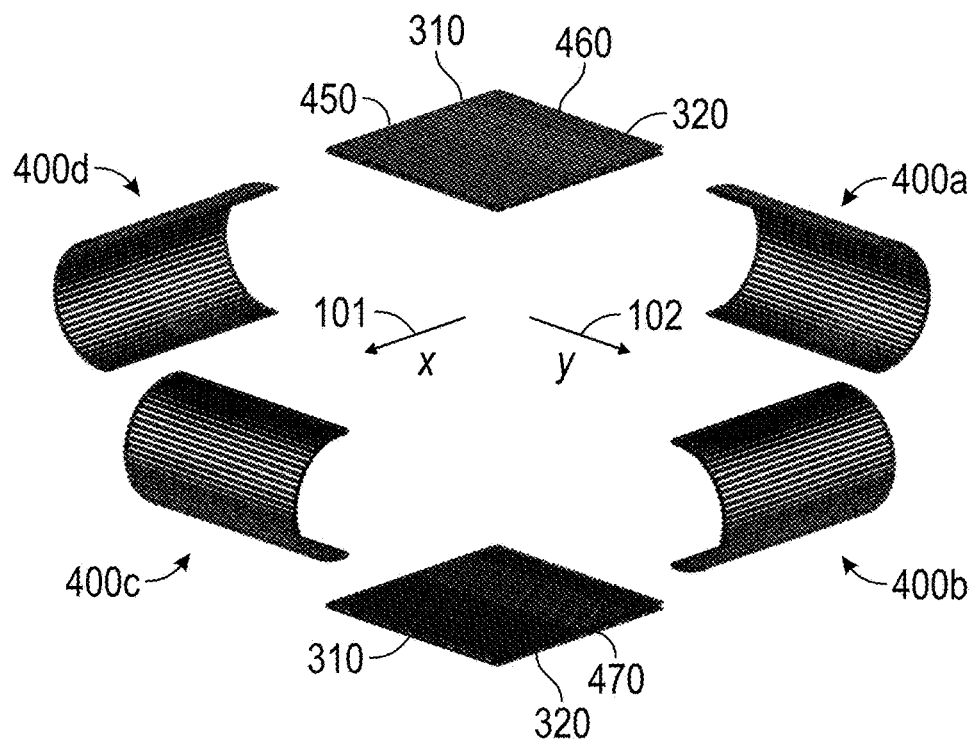
FIG. 4B is an exploded isometric view of a coil assembly showing four curved stators, a top XY-stator, and a bottom XY-stator.

FIG. 4B depicts an isometric exploded view of a stator coil assembly 450, which comprises a top XY-stator coil 460, a bottom XY-stator coil 470, and four curved sets of stator coils 400a, 400b, 400c, 400d. In some embodiments, top XY-stator coil 460, bottom XY-stator coil 470, and the four curved sets of stator coils 400a, 400b. 400c, 400d are encapsulated by a low-friction material such as, but not limited to, ultra-high molecular weight polyethylene.

Figure 4C:
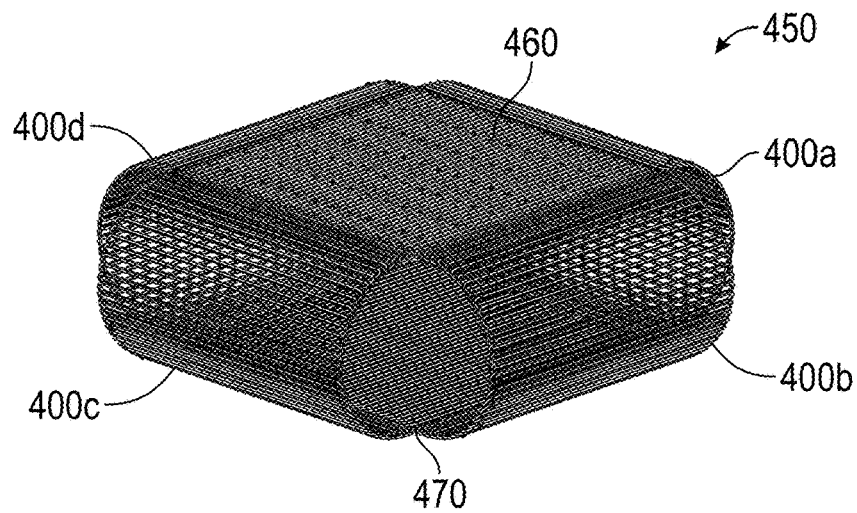
FIG. 4C is an isometric view of a coil assembly showing four curved stator coils, a top XY-stator coil set, and a bottom XY-stator coil set.

FIG. 4C depicts an isometric view of a stator coil assembly 450.

As depicted in FIGS. 4B and 4C, a top edge of one of the four curved sets of stator coils 400a, 400b. 400c, 400d is adjacent to each edge of a top XY-stator coil 460, and a bottom edge of one of the four curved sets of stator coils 400a, 400b, 400c, 400d is adjacent to each edge of a bottom XY-stator coil 470. In this embodiment, two of the four curved sets of stator coils 400a, 400c align with a set of X-stator coils 310 in a top XY-stator coil 460 and with a set of X-stator coils 310 in a bottom XY-stator coil 470. In this same embodiment, the other two of the four curved sets of stator coils 400b, 400d align with a set of Y-stator coils 320 in a top XY-stator coil 460 and with a set of Y-stator coils 320 in a bottom XY-stator coil 470.

Figure 4D:
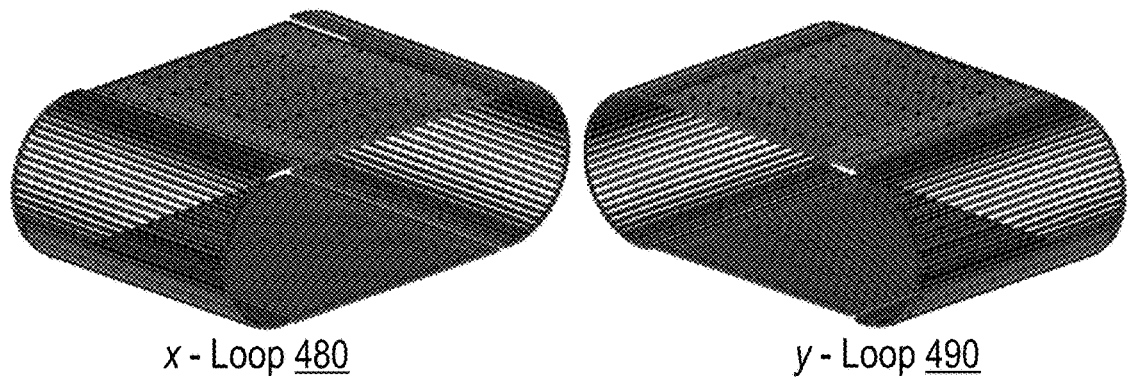
FIG. 4D is a partially exploded isometric view of a coil assembly showing an X-loop and a Y-loop.

FIG. 4D depicts an isometric exploded view of a stator coil assembly 450 showing X-loop 480 and Y-loop 490. X-loop 480 comprises a set of X-stator coils 310 in a top XY-stator coil 460, a set of X-stator coils 310 in a bottom XY-stator coil 470, and two curved sets of stator coils 400a, 400c, Y-loop 490 comprises a set of Y-stator coils 320 in a top XY-stator coil 460, a set of Y-stator coils 320 in a bottom XY-stator coil 470, and two curved sets of stator coils 400b, 400d.

X-loop 480 and tile assembly 140 create a linear motor that allows some or all of tile assembly 140 to move in a looped fashion from a first point on X-loop 480, around the entire surface of X-loop 480, and back to said first point on X-loop 480. In some embodiments, all of the stator coils 315, 405 in the X-loop 480 are approximately parallel.

Y-loop 490 and tile assembly 140 create a linear motor that allows some or all of tile assembly 140 to move in a looped fashion from a first point on Y-loop 490, around the entire surface of Y-loop 490, and back to said first point on Y-loop 490. In some embodiments, all of the stator coils 325, 405 in the Y-loop 490 are approximately parallel.

In the depicted embodiment, the set of X-stator coils 310 is aligned such that the major axis of each stator coil 315 is perpendicular to x-axis 101, so that the linear motor created by the tile assembly 140 and the set of X-stator coils 310 creates motion along x-axis 101; and the set of Y-stator coils 320 is aligned such that the major axis of each stator coil 325 is perpendicular to y-axis 102, so that the linear motor created by the tile assembly 140 and the set of Y-stator coils 320 creates motion along y-axis 102. In the disclosed embodiment, x-axis 101 and y-axis 102 are orthogonal. Some variation to this relative positioning may be used so long as x-axis 101 and y-axis 102 remain approximately orthogonal within normal engineering practice.

In the depicted embodiment, the curved set of stator coils 400 is aligned such that each stator coil 405 is parallel to a curved surface, so that the linear motor created by the tile assembly 140 and the curved set of stator coils 400 creates motion along said curved surface.

In some embodiments, all of the stator coils 315, 405 in the X-loop 480 are de-energized when Y-loop 490 is engaged. Likewise, all of the stator coils 325, 405 in the Y-loop 490 are de-energized when X-loop 480 is engaged. We speculate that X-loop 480 and Y-loop 490 being orthogonal and the respective de-energizing of X-loop 480 and Y-loop 490 as described in this paragraph avoid coupling between X-loop 480 and Y-loop 490.

Figure 4E:
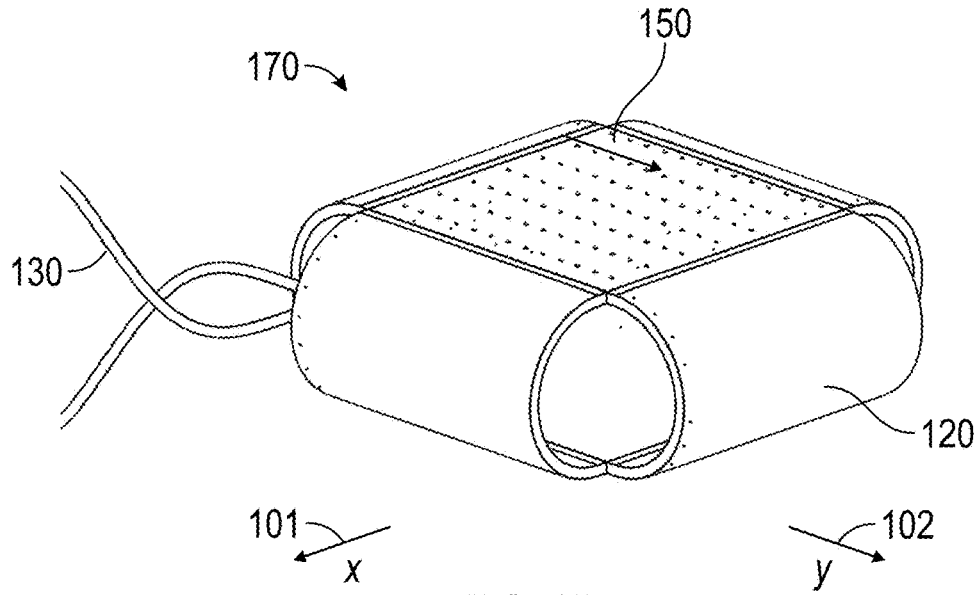
FIG. 4E is an isometric view of a stator assembly.

FIG. 4E shows stator assembly 170. Stator assembly 170 comprises a plurality of return chutes 120, power and control cable 130, and one or more XY-stators 150 (shown in FIG. 2 and FIG. 3A).

Figure 5:
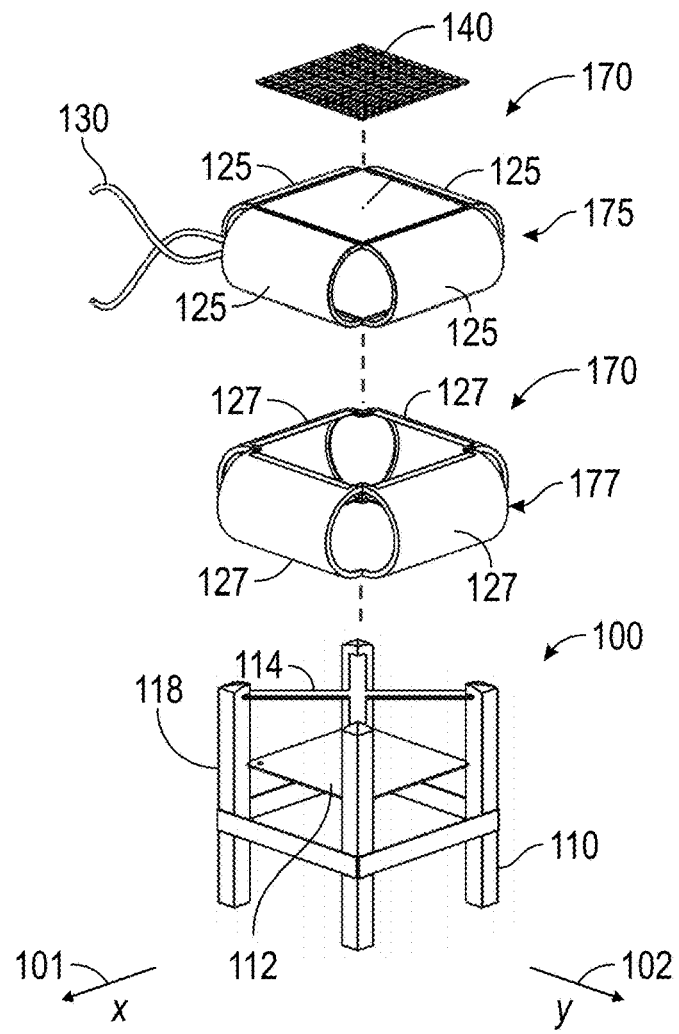
FIG. 5 is an exploded view of an XY sorter

FIG. 5 shows an exploded view of an XY sorter 100 and depicts the relative placement of tile assembly 140, stator assembly 170, and frame 110. Frame 110 further comprises bottom stator plate 112 and top stator support 114. Bottom stator plate 112 and top stator support 114 provide structural support for stator assembly 170. Stator assembly 170 comprises inner assembly 175 and outer assembly 177. Inner assembly 175 further comprises a plurality of inner chute surfaces 125, and outer assembly 177 further comprises a plurality of outer chute surfaces 127. Outer assembly 177 is affixed to inner assembly 175 such that each inner chute surface 125 is aligned with an outer chute surface 127 to create the plurality of return chutes 120. Thus, each return chute 120 has an interior space capable of receiving tile assembly 140 and allowing said tile assembly 140 to pass through and exit the return chute 120.

In some embodiments, stator assembly 170 comprises stator coil assembly 450, such that stator coil assembly 450 is inside inner assembly 175 and is nearly flush with a plurality of return chutes 120; and, in such embodiments, the return chutes 120 of stator assembly 170 are configured such that tile assembly 140 is maintained at a predetermined distance from stator coil assembly 450 (i.e., when passing through a return chute 120, tile assembly 140 is maintained at a predetermined distance from the respective curved set of stator coils 400 of stator coil assembly 450).

Figure 6A:
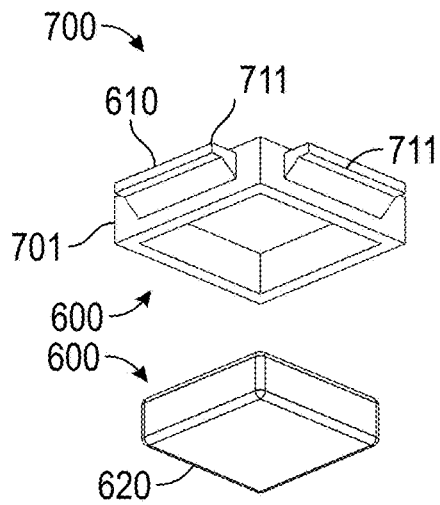
FIG. 6A is an isometric view of a magnetic tile.

FIG. 6A shows an exploded isometric view of a magnetic tile 600. A magnetic tile 600 is an exemplary embodiment of a tile 700. A tile 700 comprises a tile body 701 and one or more connectors 711. In this demonstrative embodiment, the connectors 711 are located on one or more sides of tile body 701. A connector 711 is a mechanism for connecting one tile 700 to another tile 700. A magnetic tile 600 further comprises an outer housing 610 and a magnet 620. Magnet 620 is removably affixed to magnetic tile 600 in outer housing 610. A tile 700 may also be a non-magnetic tile 710 (shown in FIG. 6B-6D). A non-magnetic tile 710 is a tile 700 that does not house a magnet 620.

In an exemplary embodiment, outer housing 610 and connectors 711 of the magnetic tiles 600 and non-magnetic tiles 710 are made of injection-molded thermoplastic. One of skill in the art will understand that other materials may be used, for example, portions of the foregoing may be made of non-magnetic metals or other suitable materials.

In one embodiment, magnetic tile 600 is approximately a square that is approximately 1 inch by 1 inch by 0.25 inches, and magnet 620 is approximately a square that is approximately 0.625 inches by 0.625 inches by 0.15 inches. In such an embodiment using Neodymium-Iron-Boron (Nd—Fe—B), each magnet 620 would have a holding strength of between approximately 1 pound and 2 pounds.

In some embodiments, each stator coil 315, each stator coil 325, and each stator coil 405 is configured with regards to the magnets 620 in tile assembly 140 to impart a force of between 0 and approximately 3 force pounds on each magnet 620, with representative embodiments applying about 0.25 force pounds, about 0.5 force pounds, about 0.75 force pounds, about 1 force pound, about 1.25 force pounds, about 1.5 force pounds, about 1.75 force pounds, about 2 force pounds, about 2.25 force pounds, about 2.5, and about 2.75 force pounds.

In one embodiment, a one square foot section of tile assembly 140 would have 36 magnets 620, providing for a typical thrust of between about 30 force pounds and about 40 force pounds.

In an embodiment using ultra-high molecular weight polyethylene for surfaces along which tile assembly 140 slides, the surfaces would have a coefficient of friction of approximately 0.2. In such an embodiment, tile assembly 140 would be suitable for moving packages weighing about 20 pounds per square foot and would be able to move packages in excess of 100 pounds.

Magnet 620 is a permanent magnet and may be made out of any suitable material, such as, but not limited to, Neodymium-Iron-Boron or Samarium-Cobalt. In some embodiments, magnet 620 is a polymagnet, also known as a programmable magnet, which is a magnetic structure that incorporates correlated patterns of magnets with varying or alternating polarity to achieve a desired behavior. In some embodiments, magnet 620 is a polymagnet arranged in a Halbach array. A Halbach array is an arrangement of magnets that results in a magnetic field in one side of the array being significantly stronger than the magnetic field on the other side of the array.

Figure 6B:
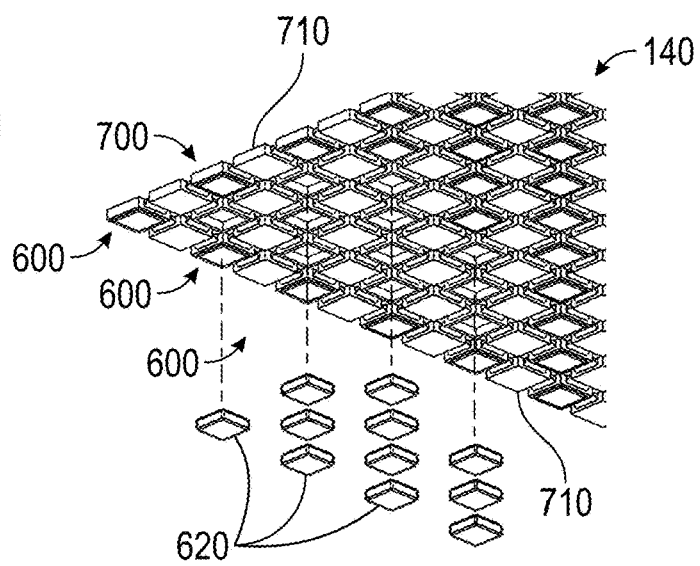
FIG. 6B is an isometric view of a tile assembly.

FIG. 6B shows an isometric view of a tile assembly 140 comprising a plurality of tiles 700 that are connected to one another by a plurality of connectors 711. Some of the magnetic tiles 600 are depicted in an exploded view, with dashed lines showing the association between magnet 620 and outer housing 610.

In the depicted demonstrative embodiment, the plurality of tiles 700 is a plurality of magnetic tiles 600 and a plurality of non-magnetic tiles 710, arranged in an alternating pattern. One of skill in the art will understand that other patterns may be used. However, we speculate that the alternating pattern is particularly suitable for avoiding magnetic attraction between adjacent tiles.

FIG. 6C shows an exploded isometric view of a tile assembly 140 depicting an exemplary arrangement for the connection of a plurality of tiles 700. In the depicted demonstrative embodiment, the connectors 711 are either tabs 720 or receptacles 730. In this embodiment, a tab 720 may be inserted into a receptacle 730 to secure tiles 700 to one another. One of skill in the art will understand that tiles 700 may have any suitable number of connectors 711 and that any suitable pattern of receptacles 730 and tabs 720 may be used to create a tile assembly 140. In the depicted demonstrative embodiment, the tabs 720 are made of the same material as tile 700, although different materials may be used.

FIG. 6D shows an isometric view of the tile assembly 140 depicted in FIG. 6c, with all of the tiles 700 connected to one another via the depicted tabs 720 and receptacles 730.

In the depicted demonstrative embodiment, the tiles 700 are rigid with the exception of the tabs 720. The tabs 720 are flexible. Upon connection, the tabs 720 form a living hinge between the connected tiles 700 that varies from about 0.15 inches thick to about 0.025 inches thick at the narrowest point (i.e., middle section 724 shown in FIGS. 7A, 7B, and 7C).

In one embodiment, tiles 700 are made of an acetal polymer.

In the depicted demonstrative embodiment, each tab 720 is formed as part of a single injection-molded thermoplastic part. In other embodiments, each tile may comprise only receptacles 730, using double-sided tabs 720 to insert into, and thus connect, two respective tiles 700.

FIGS. 7A, 7B, and 7C show three successive views of a tab 720 of a magnetic tile 600 connecting to a receptacle 730 of a non-magnetic tile 710. FIGS. 7A, 7B, and 7C also show additional details about tab 720 and receptacle 730. Tab 720 further comprises an end 721, an upper lip 722, a bottom lip 723, and a middle section 724. Middle section 724 forms a connection between tile 700 and end 721. Upper lip 722 and bottom lip 723 are located on a top side of end 721 and on a bottom side of end 721, respectively. Receptacle 730 further comprises an upper groove 732 and a bottom groove 733. Upper groove 732 and bottom groove 733 are located on a top side of receptacle 730 and a bottom side of receptacle 730, respectively.

In an exemplary embodiment, tab 720, end 721, upper lip 722, bottom lip 723, and middle section 724 are formed as the same injection-molded thermoplastic part as the respective tile 700.

One of skill in the art understands that two tiles 700 are connected by inserting tab 720 into receptacle 730. Upper lip 722 slides into upper groove 732, and bottom lip 723 slides into bottom groove 733, thereby increasing the amount of friction between tab 720 and receptacle 730 and resulting in a secure connection between the two respectively connected tiles 700.

One of skill in the art also understands that both magnetic tiles 600 and non-magnetic tiles may have any suitable number of tabs 720 and any suitable number of receptacles 730.

FIG. 7C shows that, when two tiles 700 are connected, a living hinge 740 is formed. Middle section 724 is more flexible than tile 700 and end 721, and the flexibility of middle section 724 allows living hinge 740 to bend. In the depicted exemplary embodiment, middle section 724 is thinner than end 721 and tile 700, and the relative thickness allows middle section 724 to be more flexible than end 721 and tile 700.

FIGS. 6A-6C, 7A-7C, and 8A-B, and the descriptions thereof, depict and describe, among other things, a means for flexibly connecting tiles. Other forms of flexible connectors may be used as means for flexibly connecting tiles. For example, a tile assembly 140 may be manufactured by co-molding or otherwise attaching a flexible piece of fabric to serve as living hinge 740. Additionally, a combination of different plastics may be used to achieve desired flexibility.

FIGS. 8A and 8B show an isometric view and a side view of three tiles 700 connected as depicted in FIG. 7C forming two living hinges 740 further showing flexibility of living hinge 740.

FIGS. 9A-9G show successive motion of a tile assembly 140 through a stator assembly 170 in an XY sorter 100 caused by the selective application of currents to stator coils 315, stator coils 325, and stator coils 405 of the stator assembly 170. First return chute 120a, second return chute 120b, third return chute 120c, and fourth return chute 120d are each exemplary return chutes 120 and, in the depicted exemplary embodiment, are identical except for the placement on stator assembly 170.

Figure 9B:
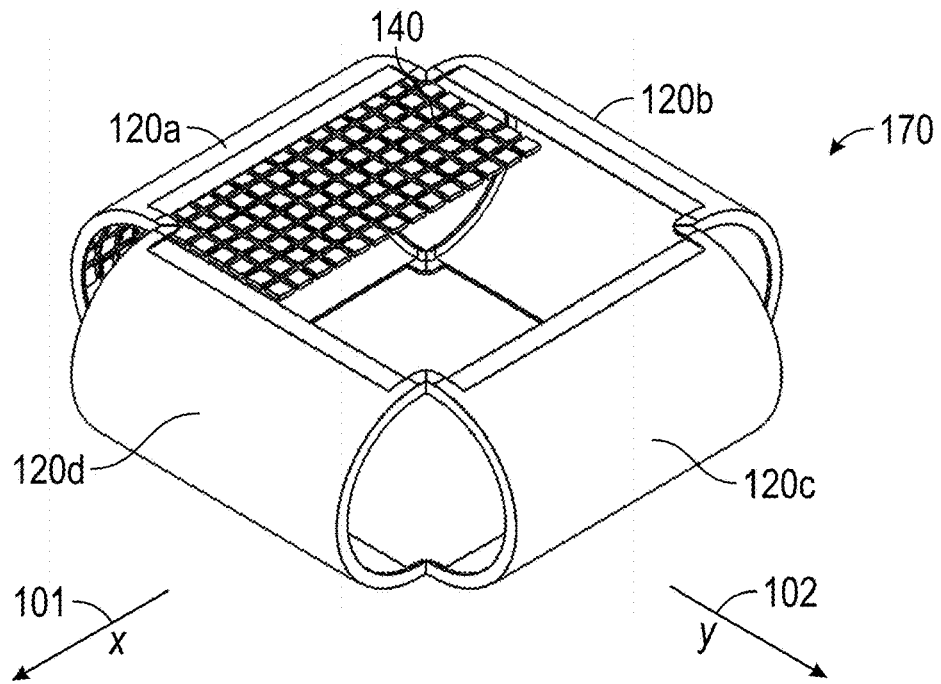
FIG. 9B is an isometric view of a tile assembly in a stator assembly of an XY sorter, with the tile assembly shown moving out of the return chute.
Figure 9C:
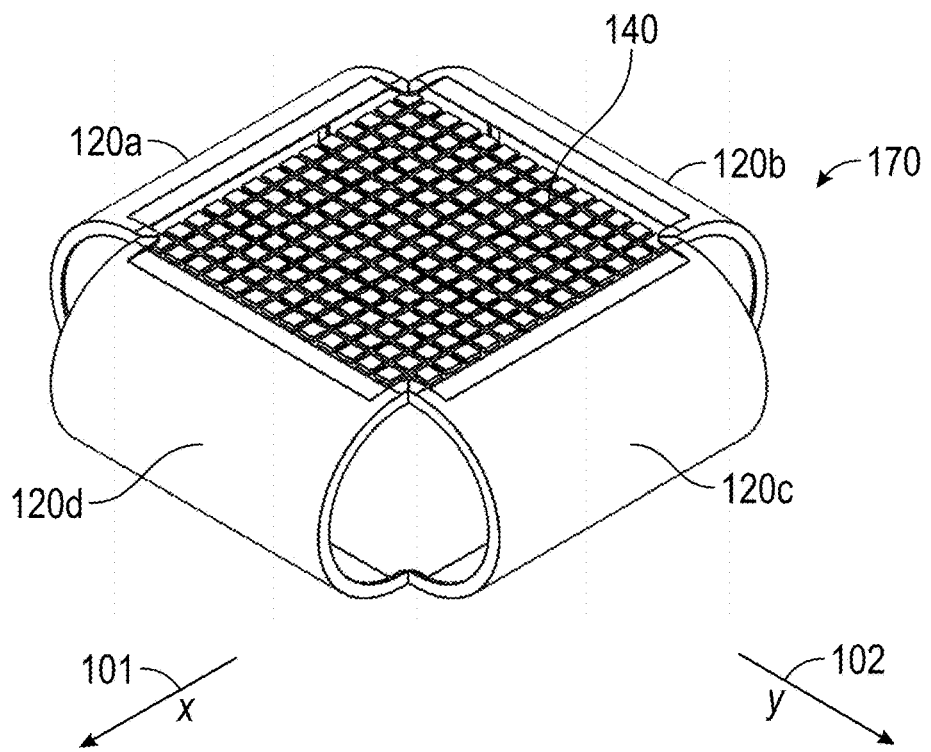
FIG. 9C is an isometric view of a tile assembly in a stator assembly of an XY sorter, with the tile assembly shown atop the XY sorter.

In FIGS. 9A, 9B, and 9C, tile assembly 140 proceeds from first return chute 120a to a top of stator assembly 170. When tile assembly 140 is on a top of stator assembly 170, tile assembly 140 may be propelled as desired to any of first return chute 120a, second return chute 120b, third return chute 120c, or fourth return chute 120d.

Figure 9D:
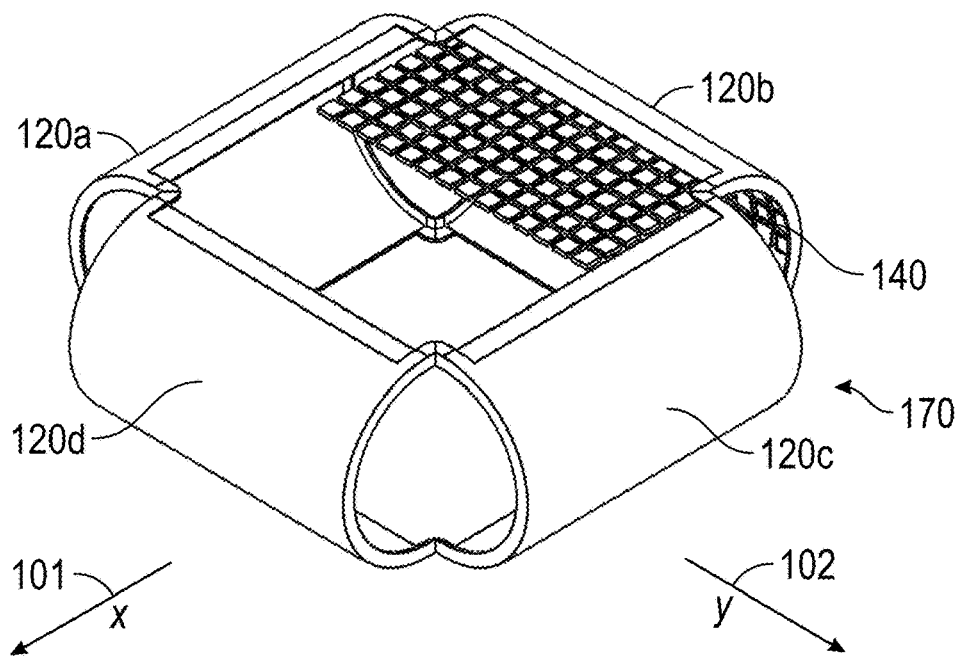
FIG. 9D is an isometric view of a tile assembly in a stator assembly of an XY sorter, with the tile assembly shown moving into a return chute.
Figure 9E:
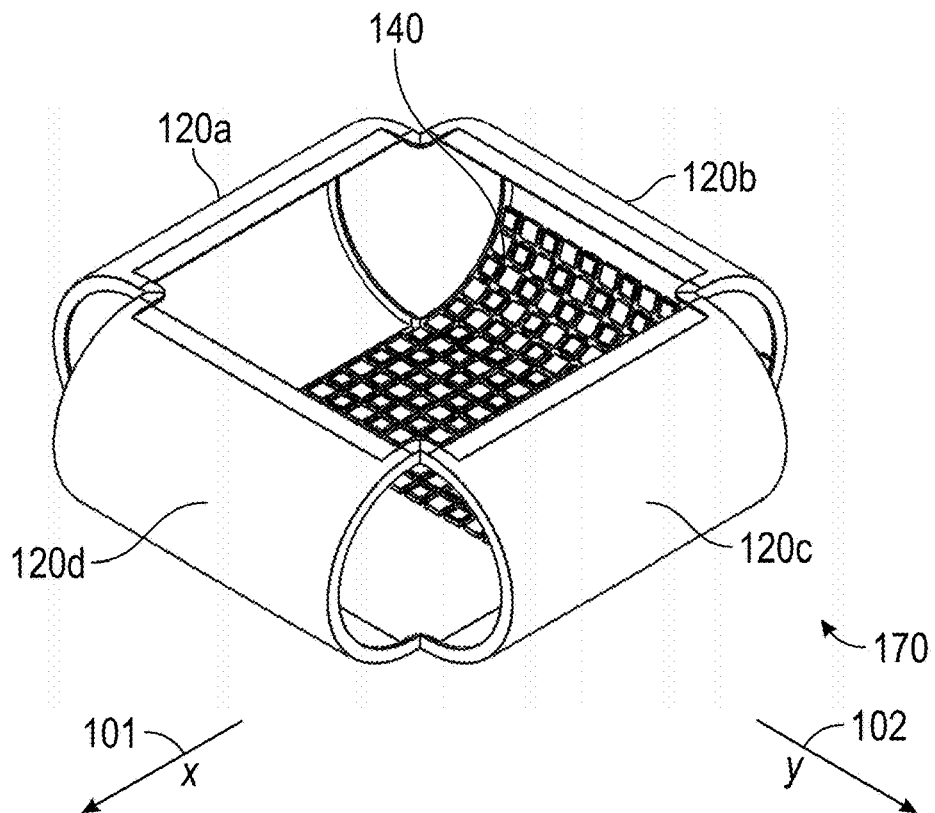
FIG. 9E is an isometric view of a tile assembly in a stator assembly of an XY sorter, with the tile assembly shown moving from a return chute to a bottom XY-stator.
Figure 9F:
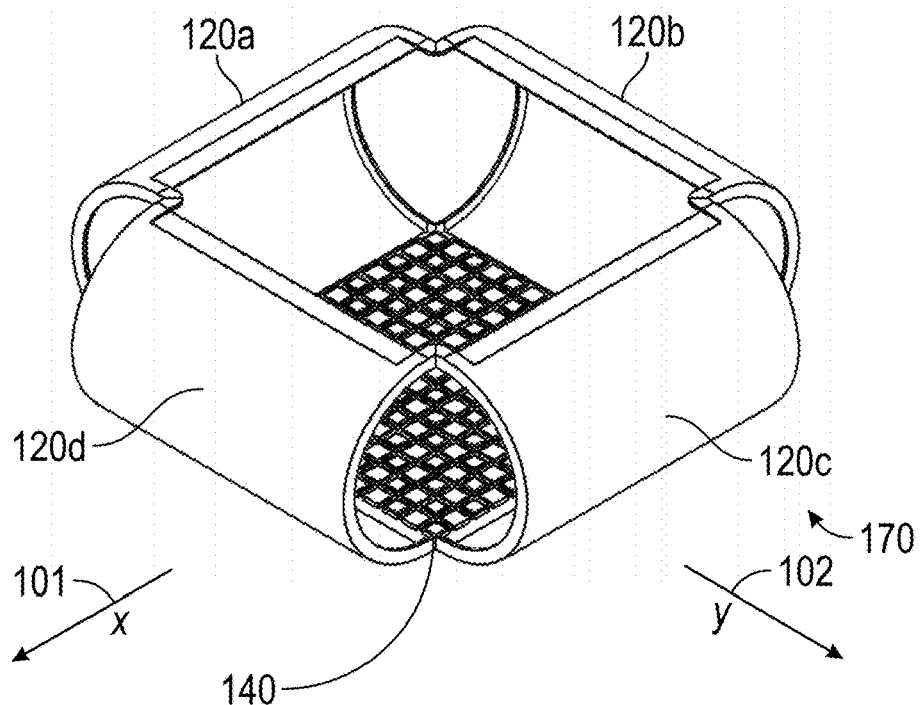
FIG. 9F is an isometric view of a tile assembly in a stator assembly of an XY sorter, with the tile assembly shown at the bottom of the stator assembly.

In FIGS. 9D, 9E, and 9F, tile assembly 140 proceeds from a top of stator assembly 170 through second return chute 120b to a bottom of stator assembly 170. When tile assembly is at a bottom of stator assembly 170, tile assembly 140 may be propelled as desired to any of first return chute 120a, second return chute 120b, third return chute 120c, or fourth return chute 120d.

Figure 9G:
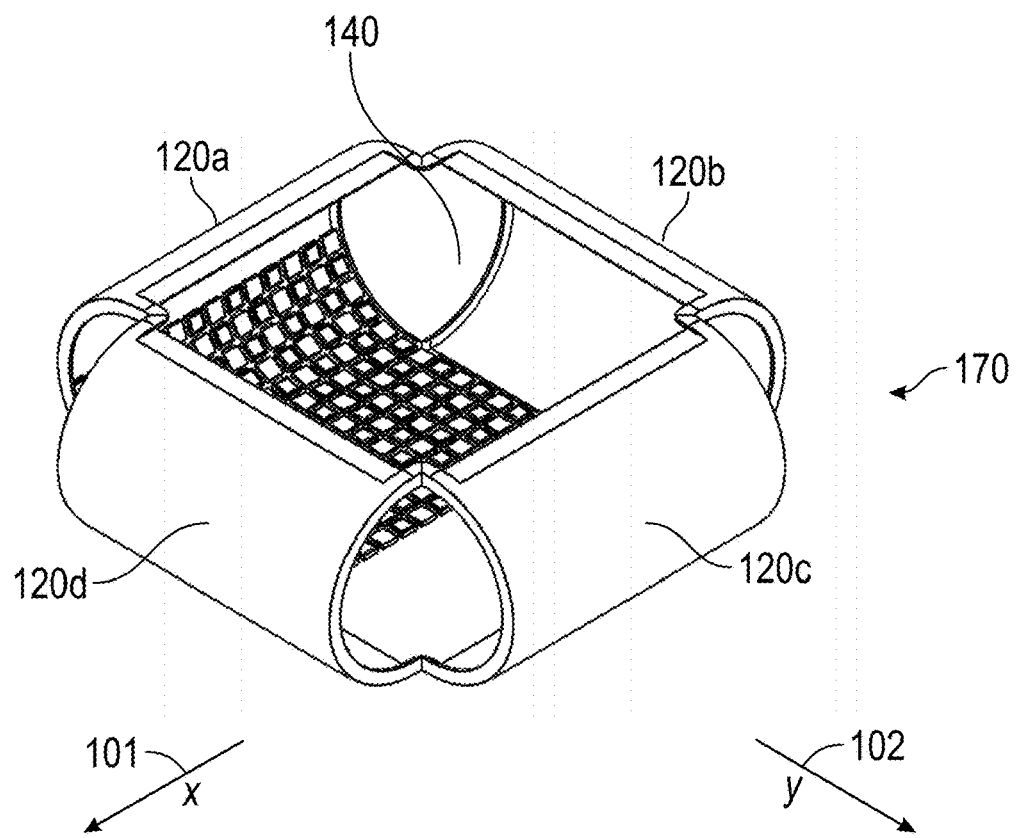
FIG. 9G is an isometric view of a tile assembly in a stator assembly of an XY sorter, with the tile assembly shown moving into a return chute.

FIG. 9G shows tile assembly 140 proceeding into first return chute 120a back to a top of stator assembly 170.

One of skill in the art will understand that it is desirable to have tile assembly 140 return to a top of stator assembly 170 as an article 1120 (shown and discussed with reference to FIGS. 11a-12) is transferred to XY sorter 100 from a conveyor 1110 (shown and discussed with reference to FIGS. 11A-11J and FIG. 12) so that tile assembly 140 can exit from the return chute 120 as article 1120 is transferred to tile assembly 140, thereby seamlessly continuing the motion of article 1120 from a conveyor 1110 to XY sorter 100.

Figure 10A:
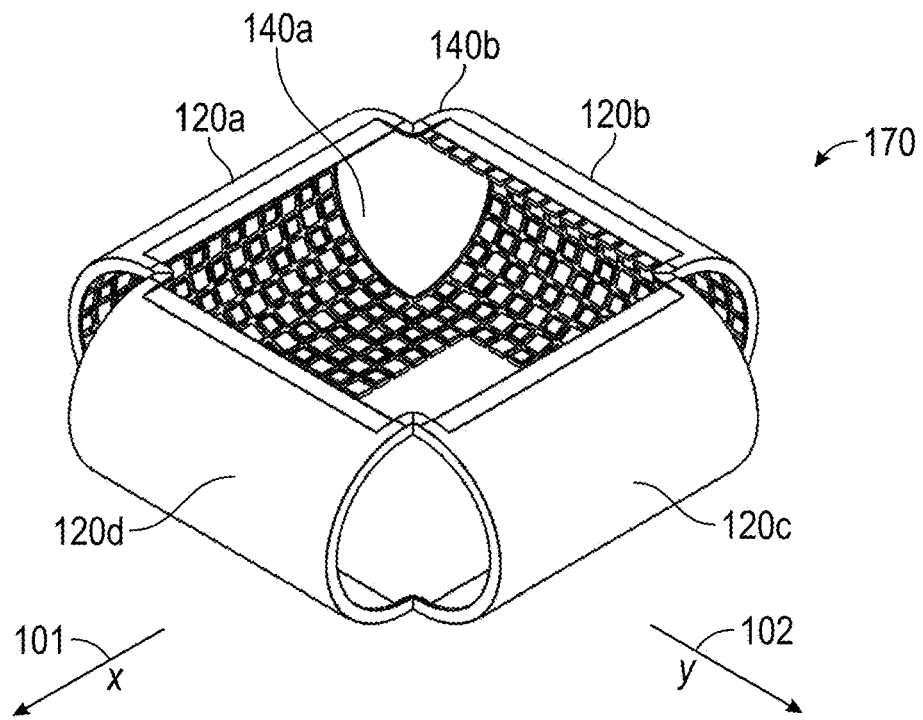
FIG. 10A is an isometric view of a plurality of tile assemblies in a single stator assembly of an XY sorter, with the tile assemblies held in return chutes.
Figure 10B:
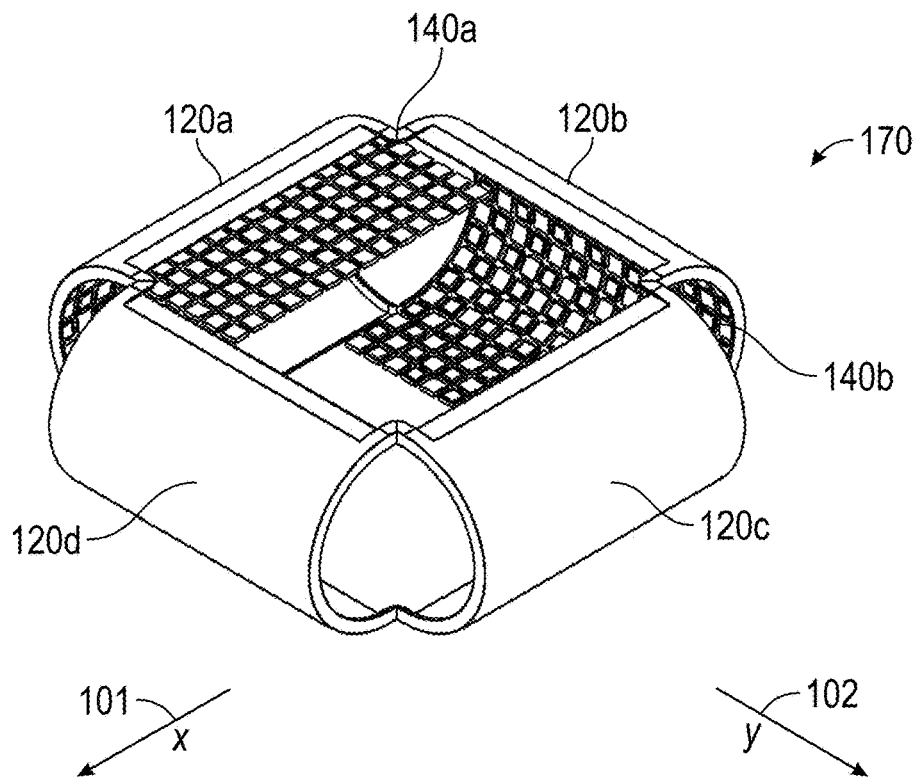
FIG. 10B is an isometric view of a plurality of tile assemblies in a single stator assembly of an XY sorter, with a first tile assembly exiting a return chute and a second tile assembly held in a different return chute.

FIGS. 10A-10C show motion of a first tile assembly 140a and a second tile assembly 140b through a stator assembly 170. First tile assembly 140a and second tile assembly 140b are both tile assemblies 140. The motion of first tile assembly 140a and the motion of second tile assembly 140b may occur simultaneously.

FIG. 10A shows first tile assembly 140a moving from a bottom of stator assembly 170 into first return chute 120a while second tile assembly 140b is held in second return chute 120b.

FIGS. 10B and 10C show first tile assembly 140a moving from first return chute 120a to a top of stator assembly 170 and second tile assembly 140b moving from second return chute 120b to a bottom of stator assembly 170.

First tile assembly 140a and second tile assembly 140b may be moved as described with reference to FIGS. 9A-9G, limited only by the location of other tile assemblies 140. For example, in the configuration depicted by FIG. 10A, second tile assembly 140b may not yet move into a bottom of stator assembly 170 because first tile assembly 140a has not fully moved into first return chute 120a.

FIG. 10D shows an isometric view of a stator assembly 170 configured with a first tile assembly 140a, a second tile assembly 140b, a third tile assembly 140c, a fourth tile assembly 140d, a fifth tile assembly 140e, and a sixth tile assembly 140f. First tile assembly 140a, second tile assembly 140b, third tile assembly 140c, fourth tile assembly 140d, fifth tile assembly 140e, and sixth tile assembly 140f are each tile assemblies 140, and, in an exemplary embodiment, differ only in their relative position and location on stator assembly 170.

FIG. 10E shows an exploded view of the configuration depicted in FIG. 10D.

One of skill in the art understands that, as discussed in detail in FIG. 10F and FIG. 10G, four of first tile assembly 140a, second tile assembly 140b, third tile assembly 140c, fourth tile assembly 140d, fifth tile assembly 140e, and sixth tile assembly 140f may be moved simultaneously to create motion solely generally along x-axis 101 or motion solely along y-axis 102. In other words, when motion occurs along x-axis 101, four tile assemblies 140 will move in unison, and when motion occurs along y-axis 102, four tile assemblies 140 will move in unison. The identity of which tile assemblies 140 that will move in unison will depend on the then-current position of each of the tile assemblies. FIGS. 10F and 100 are provided to show an explanation of which tile assemblies 140 of tile assembly 140a, second tile assembly 140b, third tile assembly 140c, fourth tile assembly 140d, fifth tile assembly 140e, and sixth tile assembly 140f will move, given a specific direction of movement and initial positioning of tile assemblies 140.

FIG. 10F demonstrates motion generally along the y-axis 102 by showing only first tile assembly 140a, second tile assembly 140b, fourth tile assembly 140d, and sixth tile assembly 140f. These four tile assemblies 140 can be moved simultaneously to achieve motion generally along y-axis 102 in either direction. An XY sorter 100 may also be configured with only these four tile assemblies 140 and these four tile assemblies may be moved in any direction as described with reference to FIGS. 9A-9F, FIG. 10G demonstrates motion generally along the x-axis 101 by showing only first tile assembly 140a, second tile assembly 140b, third tile assembly 140c, and fifth tile assembly 140e. These four tile assemblies 140 can be moved simultaneously to achieve motion generally along x-axis 101 in either direction. An XY sorter 100 may also be configured with only these four tile assemblies 140 and these four tile assemblies may be moved in any direction as described with reference to FIGS. 9A-9F.

FIGS. 11A-11J depict a grid sorting node 1100 sorting a plurality of articles 1120. A grid sorting node comprises an XY sorter 100 and a plurality of conveyors 1110. A conveyor 1110 is any suitable conveyor belt device, and an article 1120 is a package, box, container, or other item that is conveyed by a conveyor 1110.

In this demonstrative embodiment, a grid sorting node 1100 comprises four conveyors 1110. The four conveyors 1110 are a first conveyor 1110a, a second conveyor 1110b, a third conveyor 1110c, and a fourth conveyor 1110d. Each conveyor 1110 may be configured as required by the purpose of grid sorting node 1100. In this demonstrative embodiment, each conveyor 1110 is aligned with one return chute 120.

Figure 11A:
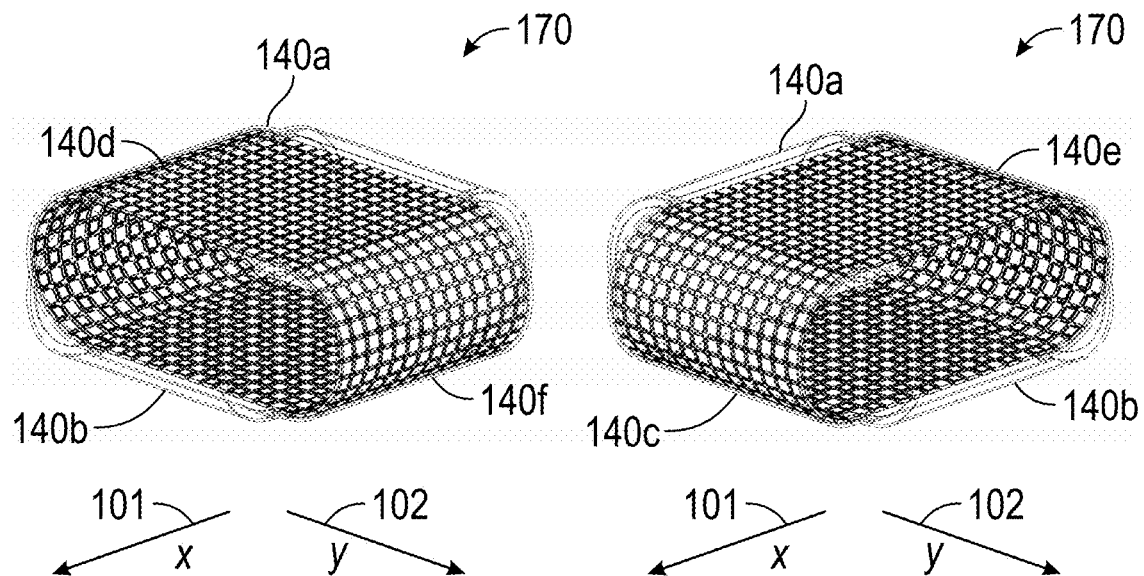
FIG. 11A is an isometric view of a grid sorting node with a first article entering an XY sorter.
Figure 11A:
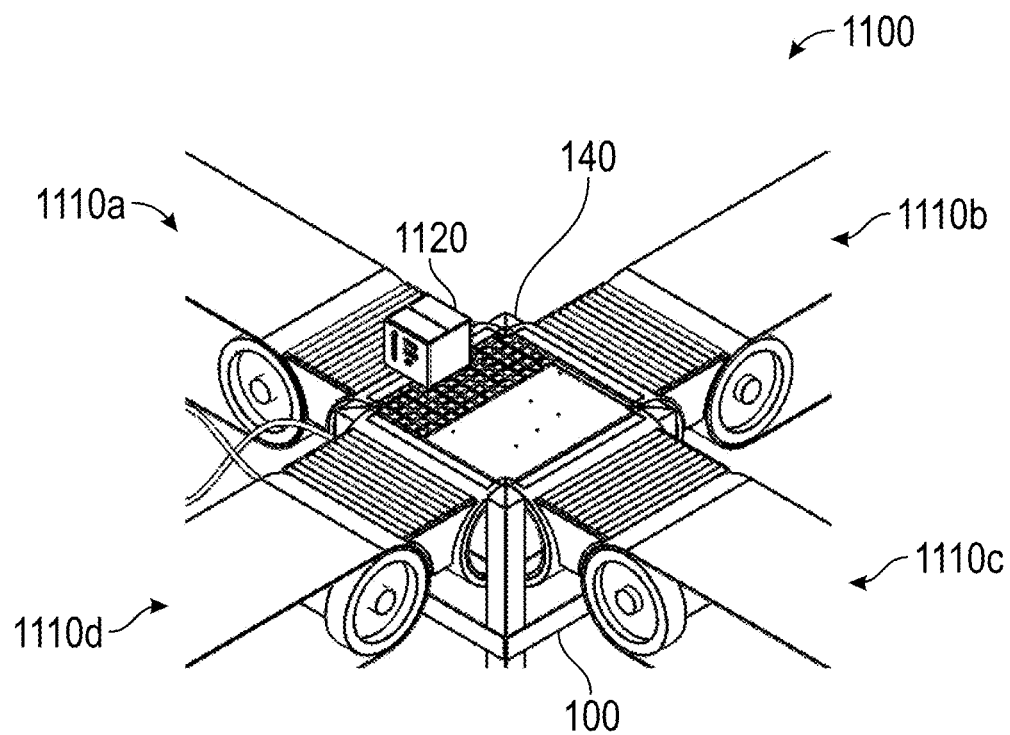

In FIG. 11A, a first article 1120 is transported from first conveyor 1110a to XY sorter 100, and tile assembly 140 is moving as described with reference to FIGS. 9A-9G to receive first article 1120.

Figure 11B:
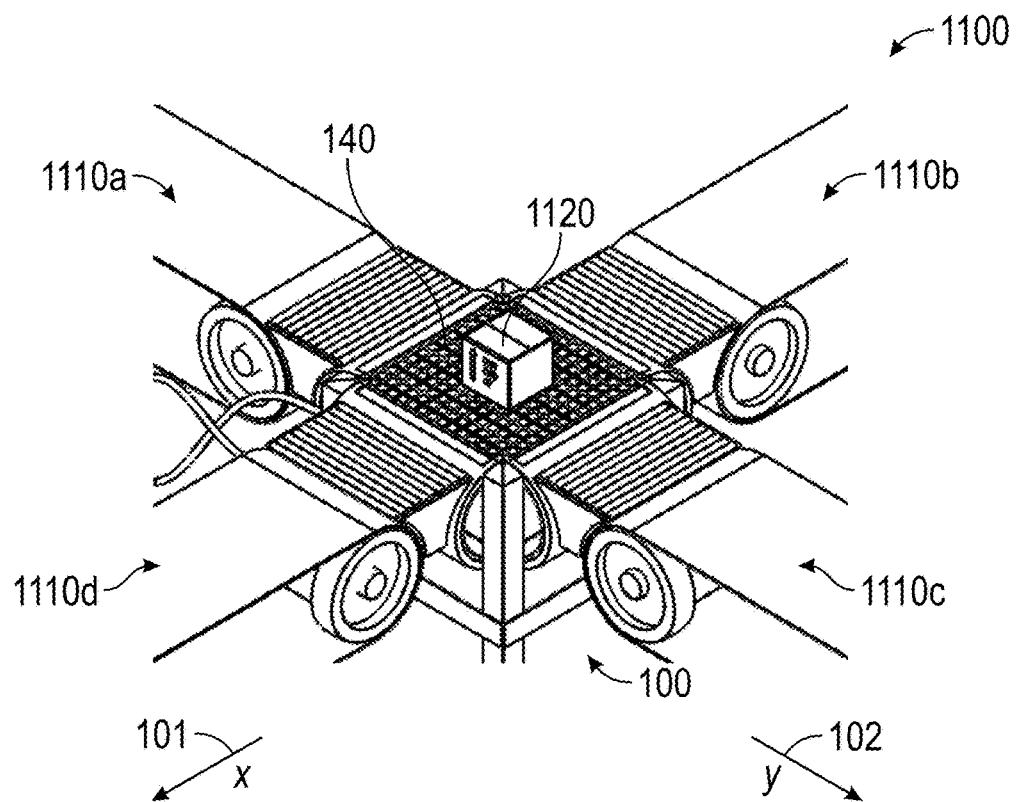
FIG. 11B is an isometric view of a grid sorting node with a first article atop the XY sorter.

In FIG. 11B, a first article 1120 is at a top location of XY sorter 100. From this point, XY sorter 100 may move tile assembly 140, and thereby convey first article 1120, in the direction of any of first conveyor 1110a, second conveyor 1110b, third conveyor 1110c, or fourth conveyor 1110d.

Figure 11C:
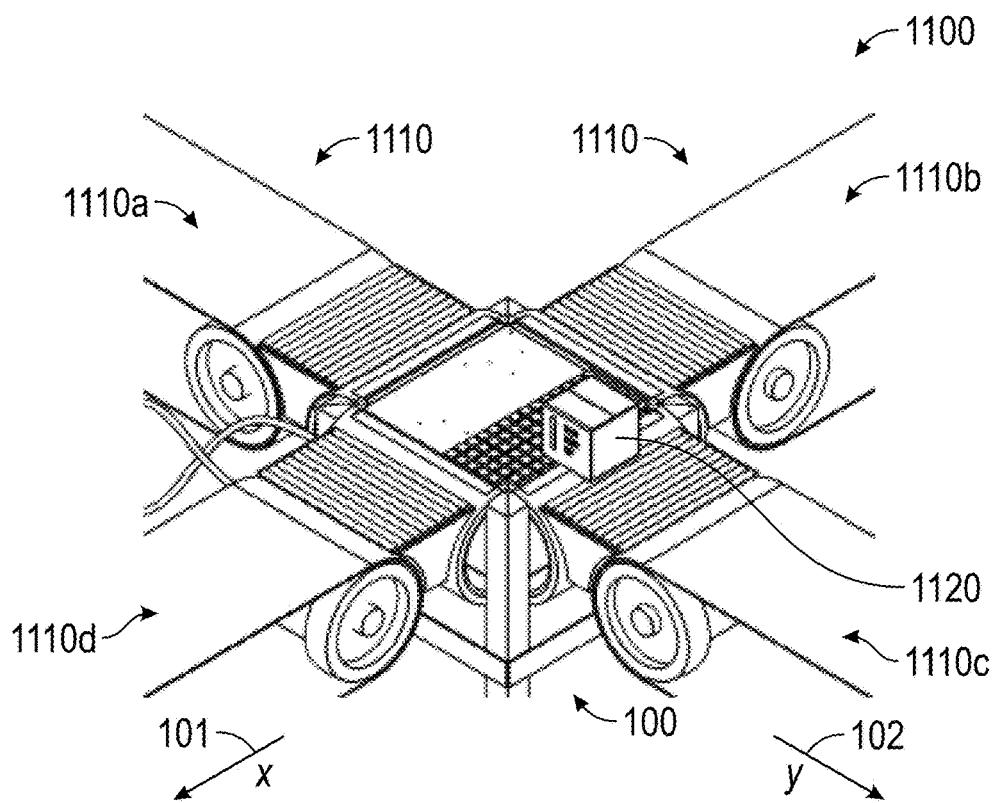
FIG. 11C is an isometric view of a grid sorting node with a first article exiting the XY sorter in a first direction.

In FIG. 11C, motion of tile assembly 140 moves a first article 1120 from XY sorter 100 to third conveyor 1110c, and tile assembly 140 moves down into a return chute 120 as described with reference to FIGS. 9A-9G.

Figure 11D:
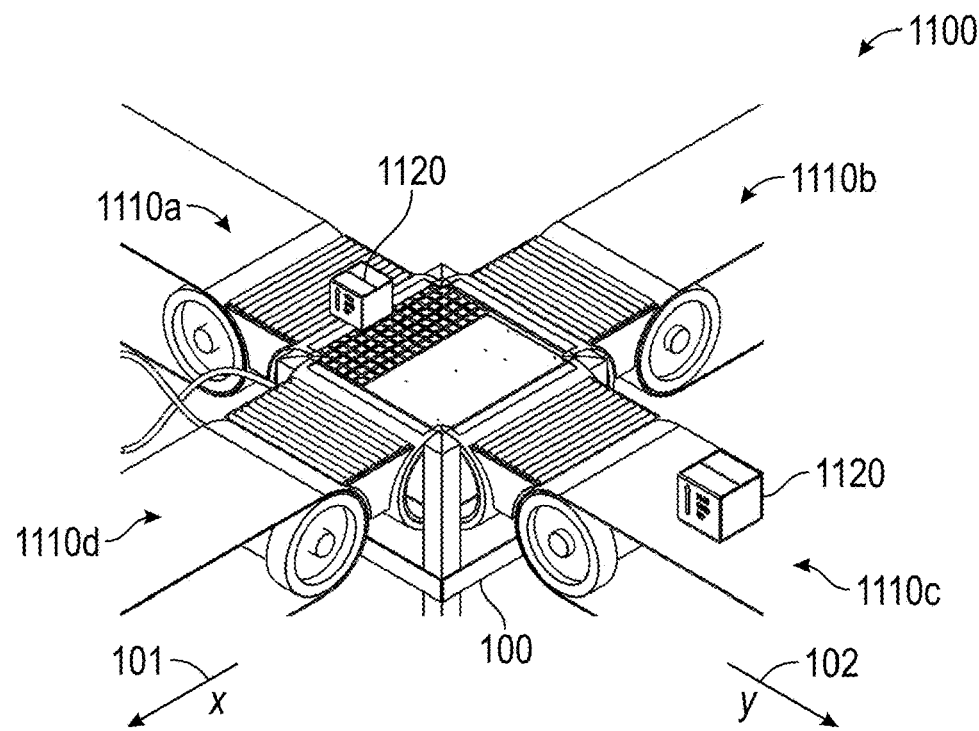
FIG. 11D is an isometric view of a grid sorting node showing a first article moving along a conveyor and a second article entering the XY sorter.

In FIG. 11D, a first article 1120 continues to be conveyed by third conveyor 1110c, and a second article 1120 is transported from first conveyor 1110a to XY sorter 100, and tile assembly 140 is moving as described with reference to FIGS. 9A-9G to receive second article 1120.

Figure 11E:
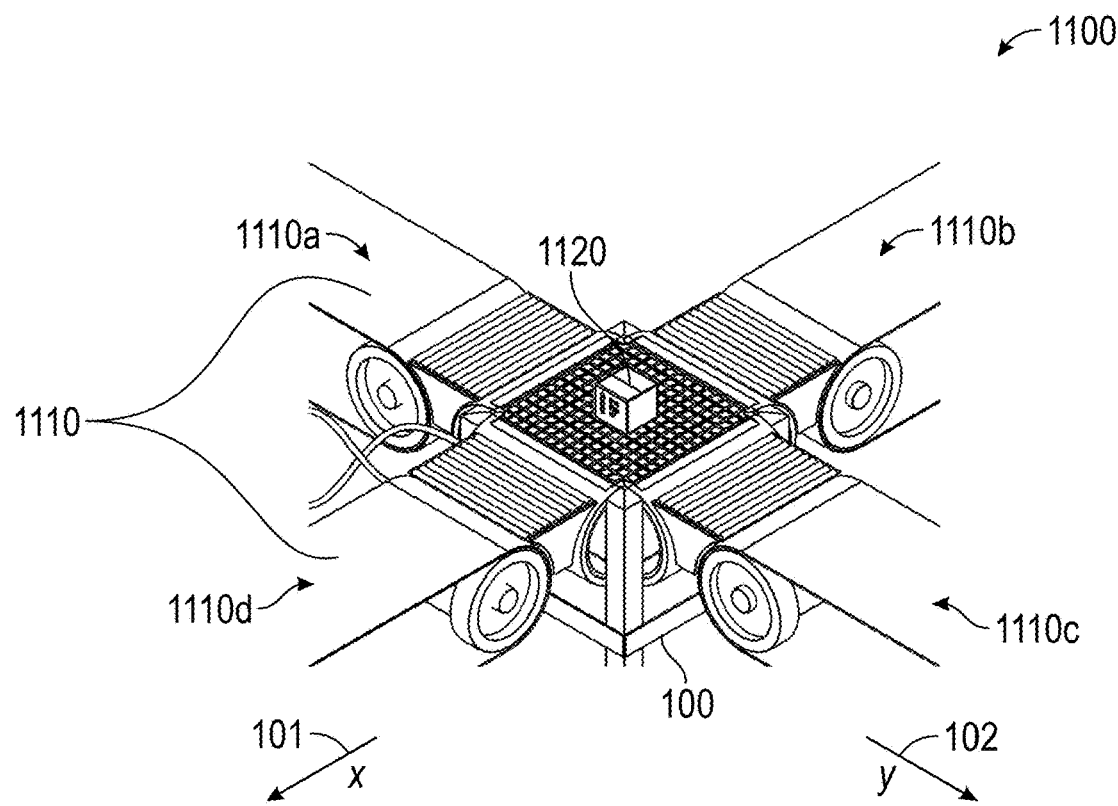
FIG. 11E is an isometric view of a grid sorting node showing a second article atop the XY sorter.

In FIG. 11E, a second article 1120 is at a top location of XY sorter 100. From this point, XY sorter 100 may move tile assembly 140, and thereby convey second article 1120, in the direction of any of first conveyor 1110a, second conveyor 1110b, third conveyor 1110c, or fourth conveyor 1110d.

Figure 11F:
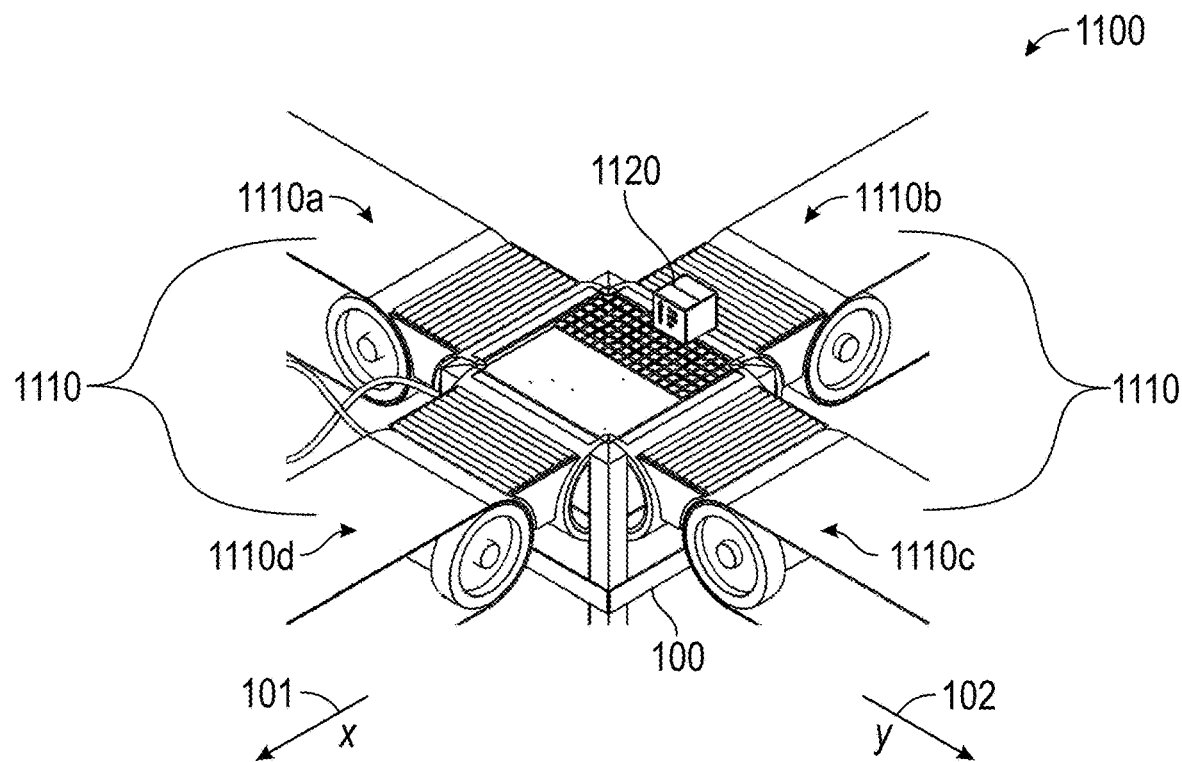
FIG. 11F is an isometric view of a grid sorting node showing a second article exiting the XY sorter in a second direction.

In FIG. 11F, motion of tile assembly 140 moves a second article 1120 from XY sorter 100 to second conveyor 1110b, and tile assembly moves down into a return chute 120 as described with reference to FIGS. 9A-9G.

Figure 11G:
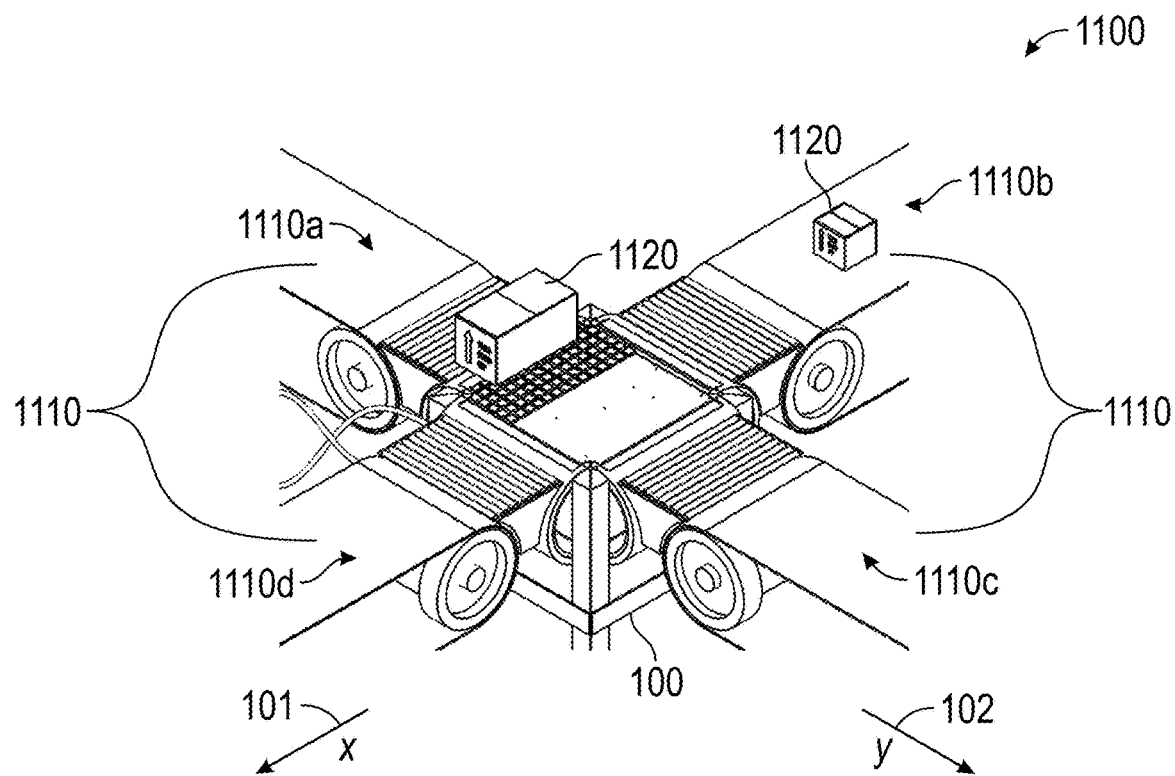
FIG. 11G is an isometric view of a grid sorting node showing a third article entering the XY sorter.

In FIG. 11G, a second article 1120 continues to be conveyed by second conveyor 1110b, and a third article 1120 is transported from first conveyor 1110a to XY sorter 100, and tile assembly 140 is moving as described with reference to FIGS. 9A-9G to receive third article 1120.

Figure 11H:
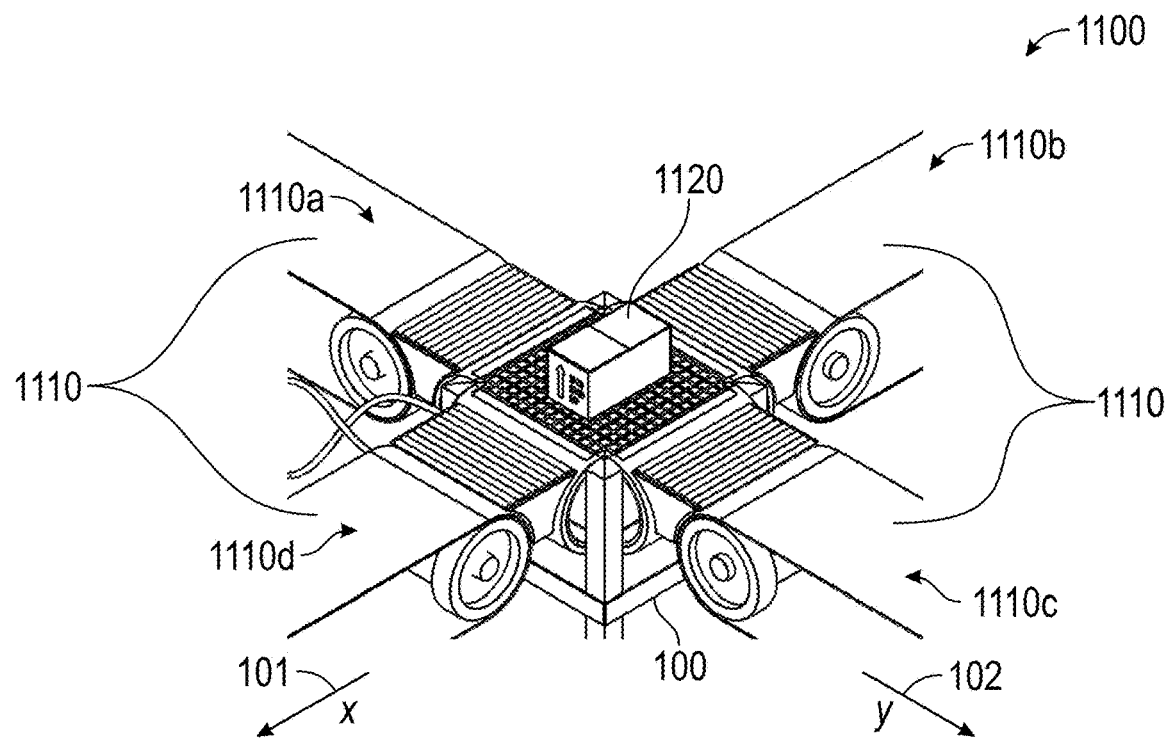
FIG. 11H is an isometric view of a grid sorting node showing a third article atop the XY sorter.

In FIG. 11H, a third article 1120 is at a top location of XY sorter 100. From this point, XY sorter 100 may move tile assembly 140, and thereby convey third article 1120, in the direction of any of first conveyor 1110a, second conveyor 1110b, third conveyor 1110c, or fourth conveyor 1110d.

Figure 11I:
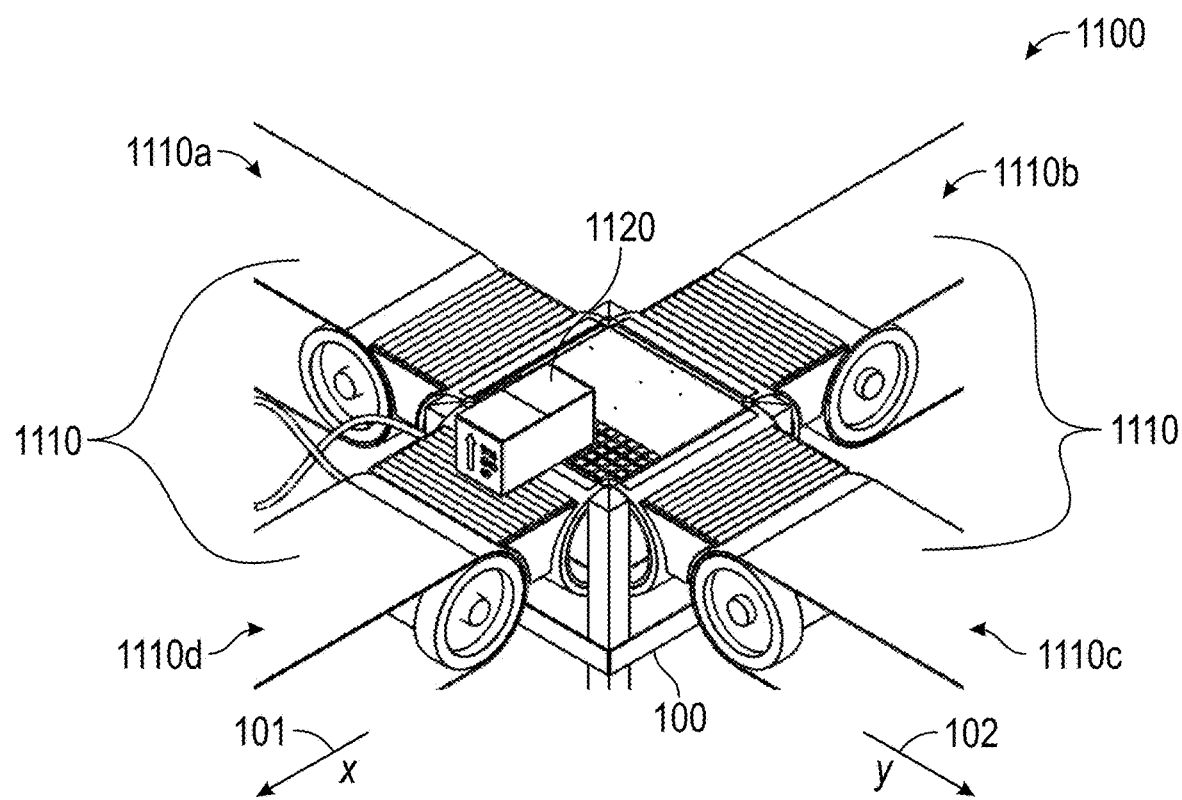
FIG. 11I is an isometric view of a grid sorting node showing a third article exiting the XY sorter in a third direction.

In FIG. 11I, motion of tile assembly 140 moves third article 1120 from XY sorter 100 to fourth conveyor 1110d, and tile assembly moves down into a return chute 120 as described with reference to FIGS. 9A-9G.

Figure 11J:
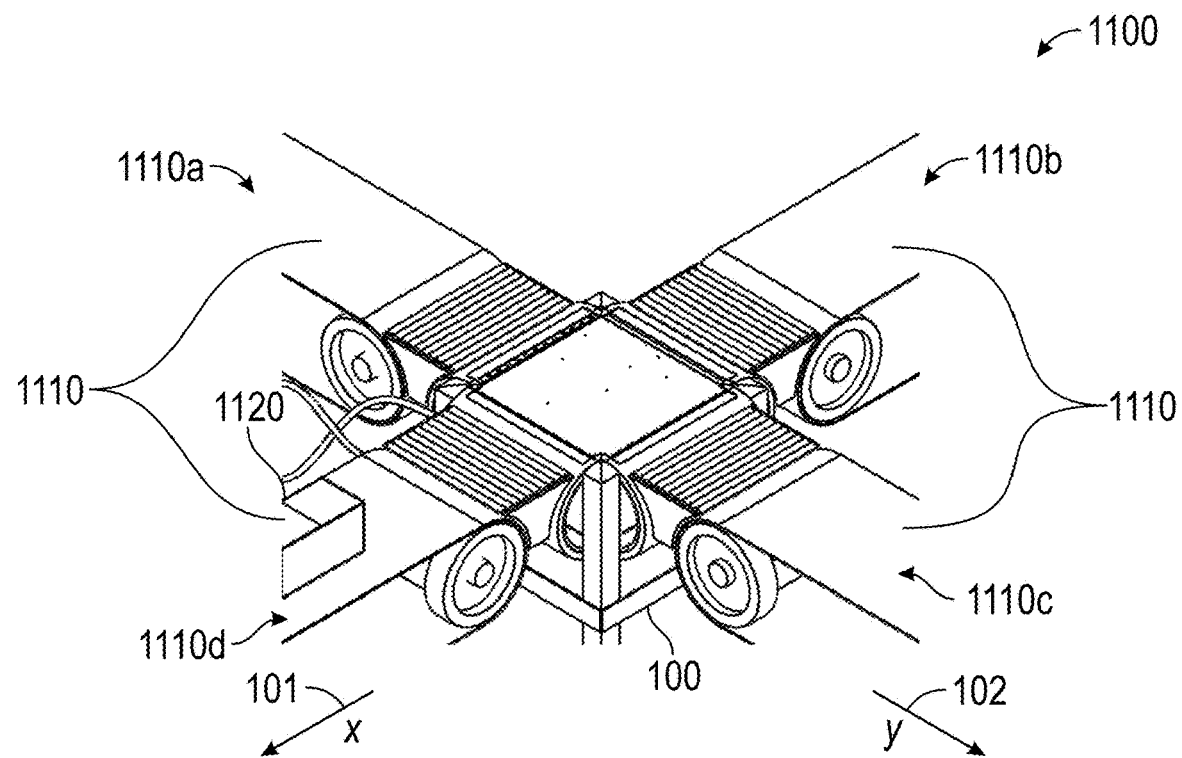
FIG. 11J is an isometric view of a grid sorting node showing a third article being transported along a conveyor in a third direction.

In FIG. 11J, third article 1120 continues to be conveyed by fourth conveyor 1110d.

Figure 12:
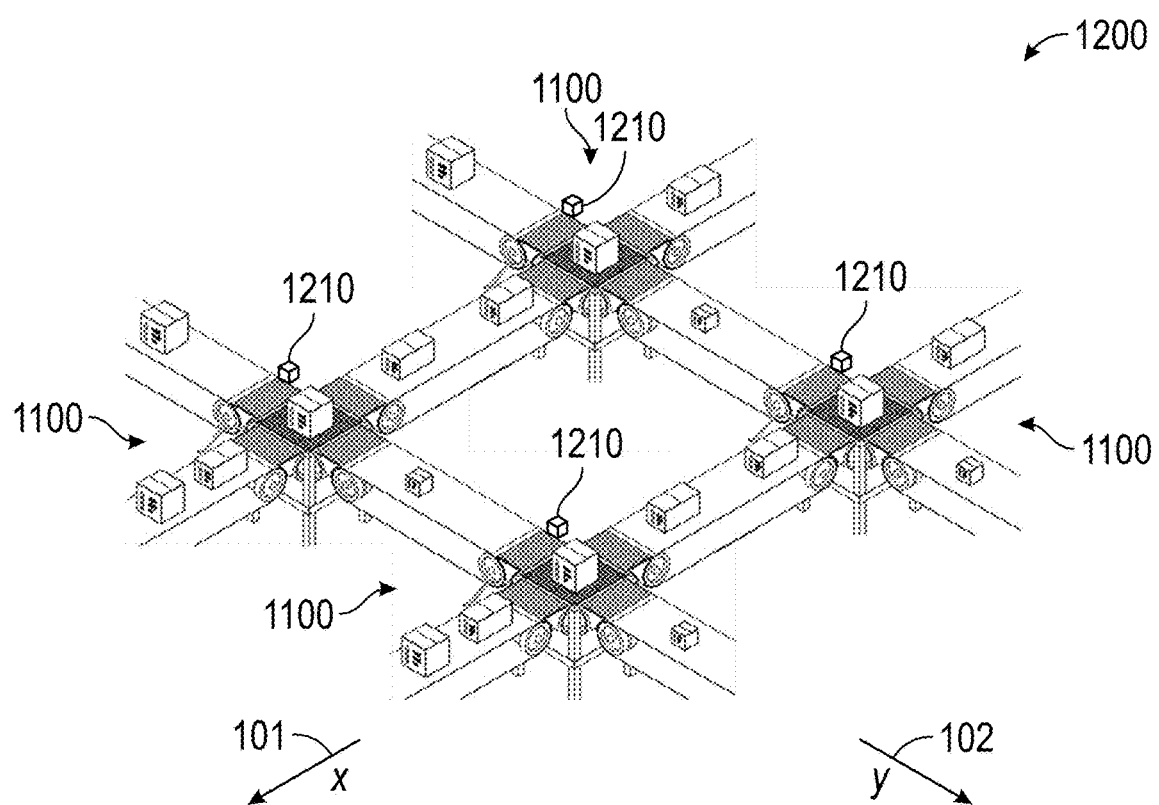
FIG. 12 is an isometric view of a plurality of XY sorters in a grid sorter.

In the exemplary embodiment depicted in FIGS. 11A-11J, the tile assemblies 140 are a square that is about the same width as the return chutes 120. Thus, the tile assemblies 140 cover about the entire top of XY sorter 100. However, a person of skill in the art will understand that a tile assembly 140 may be smaller. In such a configuration, the tile assembly 140 may be shifted along both the x-axis 101 and the y-axis 102 such that an article 1120 can be delivered by XY sorter 100 to a desired position on a conveyor 1110 (i.e., relative to the direction of motion, to a left side of a conveyor 1110 or to a right side of a conveyor 1110). In some embodiments, one conveyor 1110 as depicted may be replaced by a plurality of narrower conveyors 1110, by a plurality of chutes, or by a combination of narrower conveyors 1110 and chutes, FIG. 12 depicts a grid sorter 1200. A grid sorter comprises a plurality of grid sorting nodes 1100 operatively connected to one another via conveyors 1110 and creating one or more paths. Each path is a route along which an article 1120 may be conveyed. A grid sorter 1200 is capable of sorting and transporting a plurality of articles 1120 along the paths defined by the particular configuration of a grid sorter 1200. In the depicted embodiment, one or more sensors 1210 along conveyors 1110 detect the presence of articles and send signals to the controller controlling sorting nodes 1100 to synchronize the sorting nodes to the conveyors. A person of skill in the art will understand that grid sorting nodes 1100 may be arranged in a variety of configurations to create a variety of different paths for conveying articles.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof as permitted as a matter of law.

The invention claimed is:

1. A sorter comprising: a first XY-stator, a first tile assembly, and a controller,
   wherein said first XY-stator comprises a first set of X-stator coils, a first set of Y-stator coils, and a first plurality of Hall sensors;
   wherein said first set of X-stator coils is flush with said first set of Y-stator coils;
   wherein said first XY-stator is operatively connected to said controller;
   wherein said first tile assembly comprises a first plurality of tiles;
   wherein said first plurality of tiles includes a first plurality of magnetic tiles and a first plurality of non-magnetic tiles; and
   wherein said controller is configured to receive signals from said first plurality of Hall sensors and is configured to selectively apply currents to said first set of X-stator coils and to said first set of Y-stator coils in order to direct motion of said first tile assembly.

2. The sorter of claim 1, wherein said first plurality of tiles are connected by a plurality of means for flexibly connecting.

3. The sorter of claim 1, wherein each of said first plurality of tiles is connected to at least one other tile of said first plurality of tiles by one or more flexible connectors, wherein said one or more flexible connectors comprise at least one tab on a first one of said first plurality of tiles and at least one receptacle on a second one of said first plurality of tiles, and wherein said at least one receptacle is configured to receive said at least one tab.

4. The sorter of claim 3, wherein said at least one receptacle comprises at least one groove and said at least one tab comprises at least one lip, and said receptacle and said tab are configured to allow said at least one lip to slide into said at least one groove when said tab is fully inserted into said receptacle.

5. The sorter of claim 3, wherein said tab comprises an end and a middle section and said middle section is more flexible than a body of each of said first plurality of tiles.

6. The sorter of claim 3, wherein said tab comprises an end and a middle section and said middle section is approximately 0.015 inches thick.

7. The sorter of claim 1, wherein each of said first plurality of magnetic tiles is only connected to one or more of said first plurality of non-magnetic tiles.

8. The sorter of claim 1, wherein each of said first plurality of magnetic tiles contain one or more polymagnets arranged in a Halbach array.

9. The sorter of claim 1 further comprising a second XY-stator and a plurality of curved sets of stator coils,
   wherein an edge of said first XY-stator is adjacent to a top edge of each of said plurality of curved sets of stator coils and an edge of said second XY-stator is adjacent to a bottom edge of each of said plurality of curved sets of stator coils;
   wherein said second XY-stator comprises a second set of X-stator coils, a second set of Y-stator coils, and a second plurality of Hall sensors;
   wherein said second set of X-stator coils is flush with said second set of Y-stator coils;
   wherein said second XY-stator is operatively connected to said controller;
   wherein each of said plurality of curved sets of stator coils comprises an additional set of Hall sensors and is operatively connected to said controller; and
   wherein said controller is configured to receive signals from said second plurality of Hall sensors and each said additional set of Hall sensors and is configured to selectively apply currents to said second set of X-stator coils, to said second set of Y-stator coils, and to each additional set of stator coils in order to direct motion of said first tile assembly.

10. The sorter of claim 9, wherein said sorter is configured to apply currents in a sequence to said first XY-stator, to said second XY-stator, and to said plurality of curved sets of stator coils to move said first tile assembly from a location above said first XY-stator, along any of said plurality of curved sets of stator coils, to a location below said second XY-stator, and from a location below said second XY-stator, along any of said plurality of curved sets of stator coils, to said location above said first XY-stator.

11. The sorter of claim 9 further comprising a frame and a plurality of return chutes connected to said frame, wherein said first tile assembly passes through an interior portion of one of said plurality of return chutes, and wherein each of said plurality of return chutes limits a distance of said first tile assembly from each corresponding one of said plurality of curved sets of stator coils while said first tile assembly passes through said interior portion.

12. The sorter of claim 9, wherein said first and second XY-stators and a first two of said plurality of curved sets of stator coils form a first loop and said first and second XY-stators and a second two of said plurality of curved sets of stator coils form a second loop,
   wherein said sorter is configured to allow motion of said first tile assembly along said first loop from a first point on said first loop to any other point on said first loop and to allow motion of said first tile assembly from along said second loop from a first point on said second loop to any other point on said second loop.

13. The sorter of claim 9, wherein said sorter further comprises a second tile assembly,
   wherein said second tile assembly comprises a second plurality of tiles;
   wherein said second plurality of tiles includes a second plurality of magnetic tiles and a second plurality of non-magnetic tiles; and
   wherein said controller is configured to simultaneously control a respective position of both said second tile assembly and said first tile assembly.

14. The sorter of claim 13, wherein said first and second XY-stators and a first two of said plurality of curved sets of stator coils form a first loop and said first and second XY-stators and a second two of said plurality of curved sets of stator coils form a second loop,
   wherein said sorter is configured to allow motion of said first tile assembly and said second tile assembly along said first loop from a first point on said first loop to any other point on said first loop and to allow motion of said first tile assembly and said second tile assembly along said second loop from a first point on said second loop to any other point on said second loop.

15. The sorter of claim 14, wherein said controller is configured to direct movement of said first tile assembly along said first loop simultaneously with movement of said second tile assembly along said second loop.

16. The sorter of claim 15, wherein said first plurality of tiles are connected by a first plurality of means for flexibly connecting and said second plurality of tiles are connected by a second plurality of said means for flexibly connecting.

17. A sorter comprising: a first XY-stator, a second XY-stator, a plurality of curved sets of stator coils, a plurality of tile assemblies, and a controller;
  wherein said first XY-stator comprises a first set of X-stator coils, a first set of Y-stator coils, and a first plurality of Hall sensors; and said first set of X-stator coils is flush with said first set of Y-stator coils;
  wherein said second XY-stator comprises a second set of X-stator coils, a second set of Y-stator coils, and a second plurality of Hall sensors; and said second set of X-stator coils is flush with said second set of Y-stator coils;
  wherein said first XY-stator is operatively connected to said controller;
  wherein said second XY-stator is operatively connected to said controller;
  wherein each of said plurality of curved sets of stator coils comprises an additional set of Hall sensors and is operatively connected to said controller;
  wherein each of said plurality of tile assemblies respectively comprises a plurality of tiles;
  wherein each said plurality of tiles includes a plurality of magnetic tiles and a plurality of non-magnetic tiles;
  wherein an edge of said first XY-stator is adjacent to a top edge of each of said plurality of curved sets of stator coils and an edge of said second XY-stator is adjacent to a bottom edge of each of said plurality of curved sets of stator coils;
  wherein said controller is configured to receive signals from said first plurality of Hall sensors, said second plurality of Hall sensors, and each said additional set of Hall sensors, and is configured to selectively apply currents to said first set of X-stator coils, to said first set of Y-stator coils, to said second set of X-stator coils, to said second set of Y-stator coils, and to each additional set of stator coils, in order to direct motion of said plurality of tile assemblies.

18. The sorter of claim 17, wherein said first and second XY-stators and a first two of said plurality of curved sets of stator coils form a first loop and said first and second XY-stators and a second two of said plurality of curved sets of stator coils form a second loop,
  wherein said sorter is configured such that a first subset of said plurality of tile assemblies is capable of covering a surface of said first loop while a second subset of said plurality of tile assemblies is capable of covering a surface of said second loop;
  wherein said sorter is configured such that said sorter is capable of directing simultaneous motion of each tile assembly in said first subset along said first loop and is capable of directing simultaneous motion of said second subset along said second loop.

19. The sorter of claim 18, wherein said plurality of tile assemblies is six tile assemblies, said first subset includes a first four of said six tile assemblies, and said second subset includes a second four of said six tile assemblies, wherein said second four includes two of said first four.

20. The sorter of claim 15, wherein said first plurality of tiles are connected by a first plurality of means for flexibly connecting and said second plurality of tiles are connected by a second plurality of said means for flexibly connecting.

21. A grid sorter comprising a plurality of grid sorting nodes,
  wherein each grid sorting node comprises a first XY-stator, a first tile assembly, and a controller,
  wherein said first XY-stator comprises a first set of X-stator coils, a first set of Y-stator coils, and a first plurality of Hall sensors;
  wherein said first set of X-stator coils is flush with said first set of Y-stator coils;
  wherein said first XY-stator is operatively connected to said controller;
  wherein said first tile assembly comprises a first plurality of tiles;
  wherein said first plurality of tiles includes a first plurality of magnetic tiles and a first plurality of non-magnetic tiles; and
  wherein said controller is configured to receive signals from said first plurality of Hall sensors and is configured to selectively apply currents to said first set of X-stator coils and to said first set of Y-stator coils in order to direct motion of said first tile assembly,
  wherein each grid sorting node is operatively connected to one or more conveyors and at least one of said one or more conveyors is operatively connected to two of said plurality of sorting nodes, thereby forming one or more paths for carrying packages.

22. The grid sorter of claim 21, wherein each of said plurality of grid sorting nodes is operatively connected to four conveyors.

23. The grid sorter of claim 21, wherein said grid sorter is capable of transporting one or more packages having a weight of at least 20 pounds per square foot across any of said one or more paths.

24. The grid sorter of claim 21 comprising one or more sensors along the one or more conveyors configured to detect the presence of said packages on the one or more conveyors and to send signals to said controller to synchronize said plurality of grid sorting nodes to the one or more conveyors.

* * * * *